US005668897A

United States Patent [19]

Stolfo

[11] Patent Number: 5,668,897
[45] Date of Patent: Sep. 16, 1997

[54] METHOD AND APPARATUS FOR IMAGING, IMAGE PROCESSING AND DATA COMPRESSION MERGE/PURGE TECHNIQUES FOR DOCUMENT IMAGE DATABASES

[76] Inventor: Salvatore J. Stolfo, 80 Kenilworth Rd., Ridgewood, N.J. 07450

[21] Appl. No.: 488,333

[22] Filed: Jun. 7, 1995

Related U.S. Application Data

[63] Continuation-in-part of Ser. No. 259,527, Jun. 14, 1994, which is a continuation-in-part of Ser. No. 224,273, Apr. 7, 1994, abandoned, and a continuation-in-part of Ser. No. 213,795, Mar. 15, 1994, Pat. No. 5,497,486.

[51] Int. Cl.⁶ .................................................. G06K 9/36
[52] U.S. Cl. .................................................. 382/283
[58] Field of Search .................................. 382/135, 137, 382/138, 139, 209, 218, 282, 232, 283, 317, 284; 358/435, 436

[56] References Cited

U.S. PATENT DOCUMENTS

| | | | |
|---|---|---|---|
| 4,542,378 | 9/1985 | Suganuma et al. | 382/284 |
| 4,953,229 | 8/1990 | Abe et al. | 382/284 |
| 5,001,769 | 3/1991 | Reid-Green et al. | 382/283 |
| 5,140,650 | 8/1992 | Casey et al. | 382/283 |
| 5,182,656 | 1/1993 | Chevion et al. | 382/284 |
| 5,204,756 | 4/1993 | Chevion et al. | 382/284 |
| 5,394,487 | 2/1995 | Burger et al. | 382/209 |
| 5,497,486 | 3/1996 | Stolfo | 395/600 |

FOREIGN PATENT DOCUMENTS 2263603  7/1993  United Kingdom .................. 382/284

*Primary Examiner*—Jose L. Couso
*Attorney, Agent, or Firm*—Mitchell A. Stein; Stein & Associates, P.C.

[57] ABSTRACT

A method for processing an image, consisting of a foreground and a background, to produce a highly compressed and accurate representation of the image, including the steps of scanning the image to create a digital image of the image, comparing the digital image against a codebook of stored digital images; matching the digital image with one of the stored digital images of the codebook; producing an index code identifying the background of the stored digital image as having matched the digital image; subtracting the stored digital image from the digital image to produce a second digital image representing the foreground of the stored digital image; and storing the second digital image with the index code. Techniques are also provided to enable merge/purge of the database(s) thereby created.

18 Claims, 18 Drawing Sheets

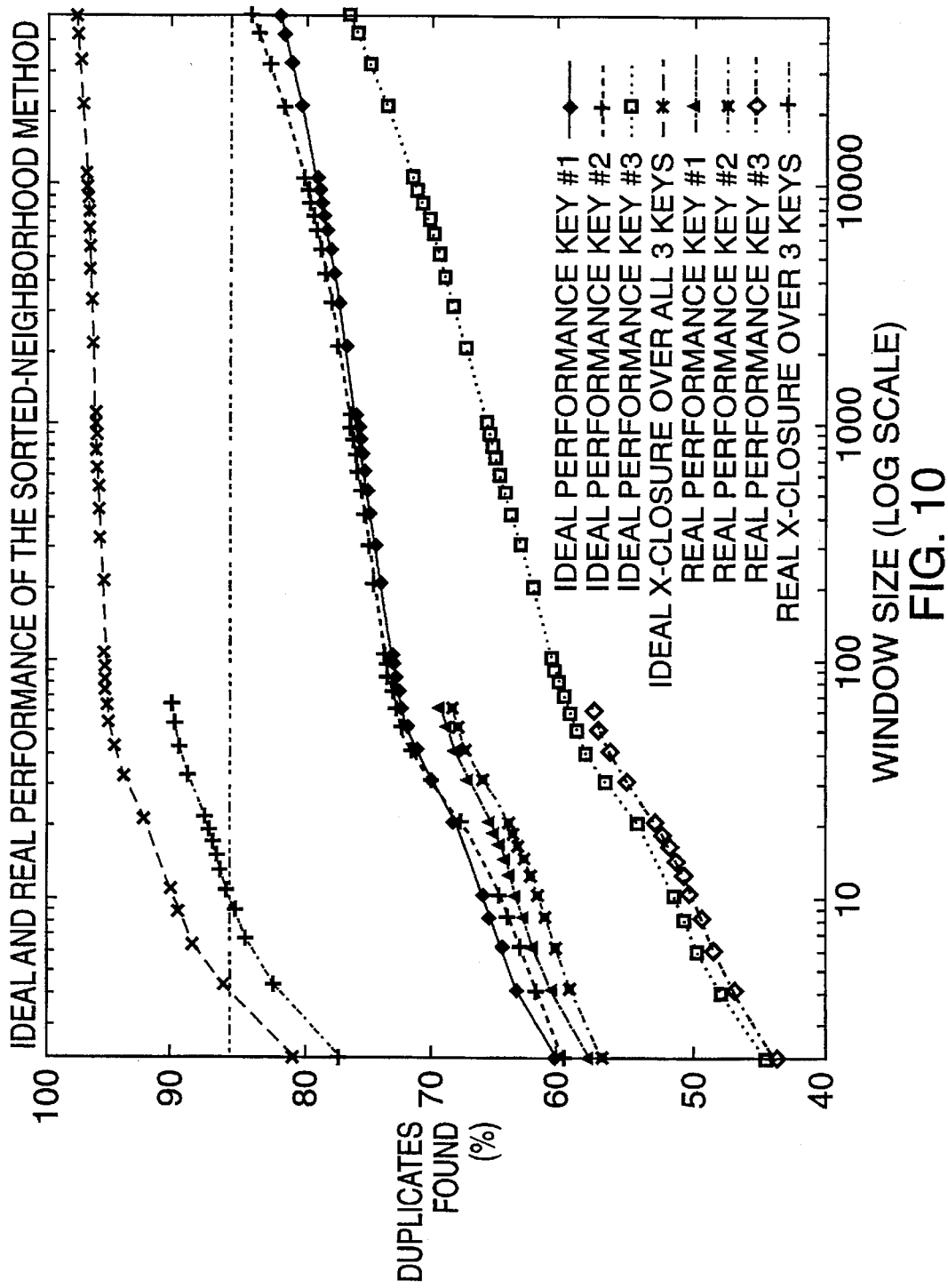

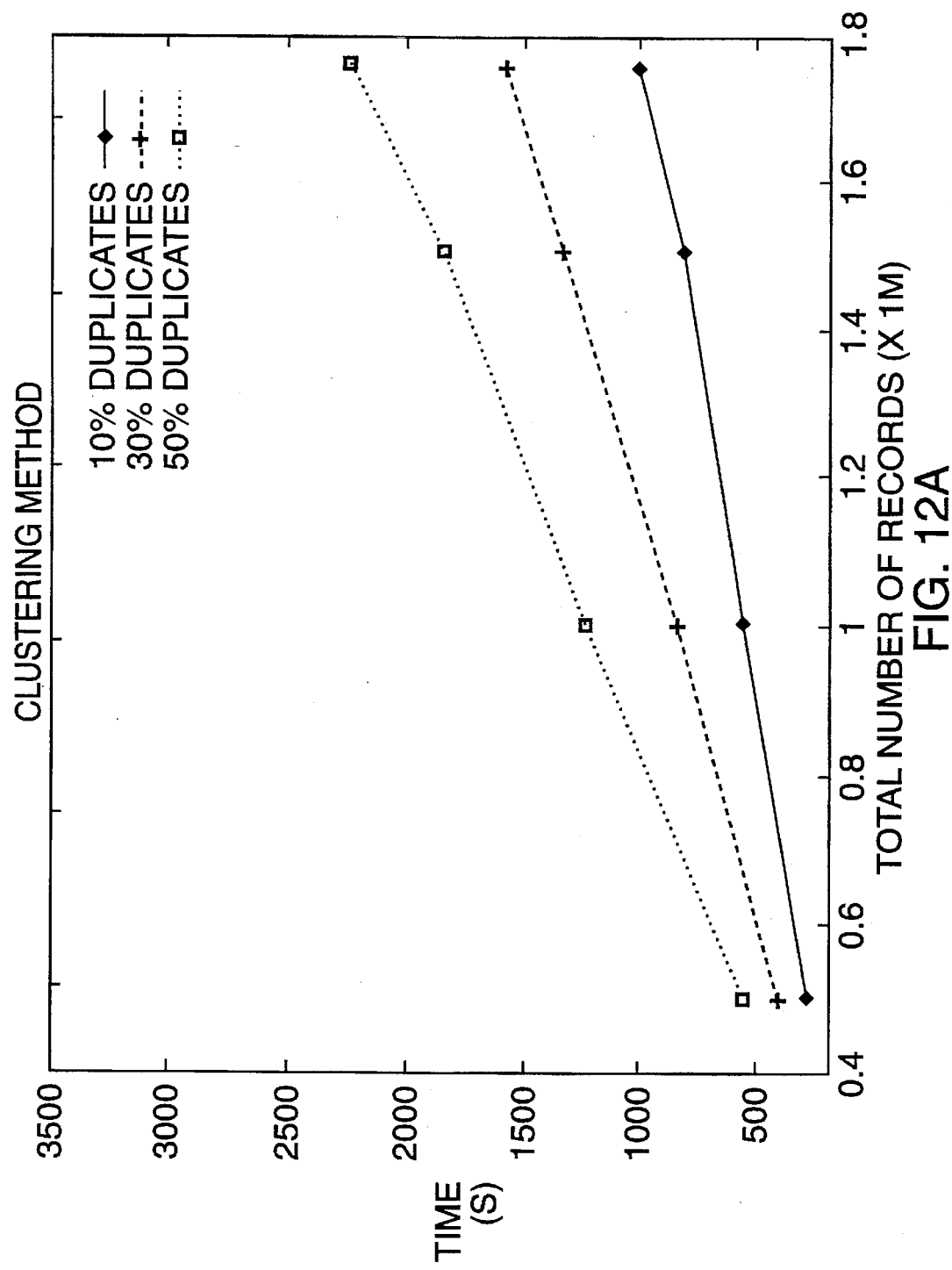

METHOD AND APPARATUS FOR IMAGING, IMAGE PROCESSING AND DATA COMPRESSION MERGE/PURGE TECHNIQUES FOR DOCUMENT IMAGE DATABASES

This application is a continuation-in-part of copending U.S. patent application Ser. No. 08/259,527, filed Jun. 14, 1994 pending, which is a continuation-in-part of U.S. patent application Ser. No. 08/224,273, filed Apr. 7, 1994 now abandoned, and a continuation-in-part of U.S. patent application Ser. No. 08/213,795, filed Mar. 15, 1994 now U.S. Pat. No. 5,479,486.

FIELD OF THE INVENTION

The present invention relates to the field of automated image processing, image compression and pattern recognition, as well document-image storage and retrieval, and more particularly to financial instrument processing to provide efficient storage and retrieval of check image information and detection of fraudulent and authentic instruments, as well as to management of databases containing document-image information, and provision of merge/purge techniques to eliminate redundancies and errors.

BACKGROUND OF THE INVENTION

Financial Instruments

In commercial and savings banking practice, monetary transfers often involve documents that include standard, preprinted information (backgrounds, logo's, icons, repetitive patterns, fields and the like) as well as post-printed information (handwritten entries, names, addresses and the like) that render the item negotiable or representative of a legal, binding contract. These items are documents that comprise forms with added information, and include, e.g., checks, deposit and withdrawal slips, coupons, travelers' cheques, letters of credit, monetary instruments, food stamps, insurance forms, title documents, official government forms, tax forms, medical forms, real estate forms, inventory forms, brochures, information forms, application forms, questionnaire forms, laboratory data forms and the like. It is generally desirable to automatically extract relevant information from a form in order to assist in the processing of that information.

A check is a negotiable instrument, which is signed by the maker or drawer, indicates a sum certain of money (or other specified value), a date to pay, and a direction to a bank or financial institution to pay to the order of the payee or to bearer on demand. The check thus generally has certain information or indications preprinted on it, information which is added to customize the check for the drawer and the payor bank, and information unique to each check written. In order for the bank to pay on the item, a check is generally first endorsed on the reverse side upon tender. Processing institutions in the international banking collection and settlement process will typically each stamp the check with identifying information, and also provide status relating to dishonor or abnormal circumstances. In normal banking procedures, the paper check passes from the maker or drawer to the payee, who then deposits the check with the payee bank. The paper check is then cleared, for example, through a central clearinghouse of one or more banks, and is sent to the payor bank. While the funds themselves typically do not, in a physical sense, pass hands, but rather are indicated electronically on daily balance sheets, the document itself, under strictures of law and custom which originated hundreds of years ago, actually passes and is returned to the maker. Electronic funds transfers are also available, but these transfers do not necessarily require a written authorization granted to the recipient of the funds, and thus do not pose the same paper handling problems.

Accordingly, in the area of check clearance, and, as well, with respect to the other instruments, items and documents, the physical document and its possession and transfer are important, since the funds are withdrawn from the drawer or maker's account while the check is returned to the maker or drawer. Thus, the paper check must generally be physically transferred through the banking system.

The check typically originates from a printing house and contains customary preprinted information that is identical from one check of a given style to the next. The check becomes a legally operative document upon the inclusion of handwritten or post-printed information, which also renders the document unique and provides for its special place in the collection process.

The originator of the check transmits the check to a point of collection (e.g., a lock-box operation that handles bulk mailings, or to the payee directly). The relevant information is verified by the payee and the check is endorsed and delivered to the bank for deposit to an account. At this point in the process, electronic notation of the transaction is performed, while the paper media is physically collected and sent through a clearing system. The paper check is then sorted and prepared for delivery to the originator's bank. The electronic information is used to net out and transfer funds between banks by the clearinghouse system. The paper check is then sent to the originator bank for sorting, debiting customer accounts (originator), microfilming, envelope stuffing and final delivery back by mail to the originator. Errors can and do occur at every stage of the process. An error may result in a liability which equals or exceeds the value of the transaction, as well as subjects the maker of the error to regulatory sanctions. Thus, only a very low error rate is tolerated.

In today's world, it is sometimes inconceivable that the cash itself never passes hands but can be electronically transferred or exchanged, while the document underlying the transfer must move from one bank to the next and cannot be electronically transferred. While this may not be the case for electronic funds transfers (which are controlled by special legislation and do not typically involve the use of checks), clearly check transfer processes are antiquated and cannot utilize the wealth of electronic data transfer mechanisms unless the integrity of the paper itself is maintained. Thus, any system which is employed to improve the efficiency of the check handling and clearing process should maintain the integrity of the information to legal standards, and also meet customer's demands for reliability, efficiency and acceptability.

In 1988 the Board of Governors of the Federal Reserve System stated that "the benefits of a nationwide electronic presentment system would not be sufficient to outweigh the costs of a nationwide system." Furthermore, the Board recommended, that the focus of such a system should be on image processing to expedite moving the payment through the system. It was made clear that by the use of image interchange, the operational and transportational expenses would be greatly reduced. Likewise, through truncation processing, the amount of stored and transmitted information can be minimized. Thus, the benefits of a check truncation system are clearly taught in the art. However, past analyses have indicated that such systems are expensive. While the use of truncation processing can minimize the information to be transmitted and stored, past systems have generated a relatively large file for each document so processed, so that this burden is not considered trivial.

It is known in the art of digital data storage and compression to compress data by compiling code libraries of information in a digital data source file, with a code library derived from the data to be compressed or with a code library having a content based on a predicted likely information content of the source file, resulting in a compressed file if the source file is represented as a series of pointers to portions of the code library, when the code library contains enough sequences in common with the source file. Thus, the series of pointers to the code library can be represented by a smaller information content signal than the data source file itself. Further, it is known that such code libraries may be adaptive and updated to include information from a digital data source file, which may be repeated elsewhere, thereby effecting a lower data storage requirement. Code libraries may also be purged of information which does not appear in files to be compressed. A limited size code library offers two advantages: first, it limits the search time to match a sequence in the source file with a sequence in the code library; and second, it limits the size of an individual pointer and therefore allows the compiled series of pointers to have an optimum length.

A match between a stored template and a scanned image is rarely exact, e.g. because of noise introduced when scanning or skew of the scanned image that may have been introduced when handling the paper document. This is so even when the template is only a portion of the input image or even when the match is based on features rather than pixel values. Consequently, a frequent method of matching a template is done by using a distance measure, $d(m,n)$, between the template and the image at all points in the image field. The input image is deemed to be a match whenever the distance is less than a preestablished threshold ($\lambda$). The distance function $D(m,n,I,T)$ is computed at a variable starting point in the input image I against template image T. Because of the skew or noise, the search of the input image may be at some localized area for a matching template.

Thus, $I(j,k)$ can denote the input image to be searched and $T(j,k)$ the template image sought, where the search is constrained over some region of $I(m,n)$, of the image where $0 \leq m \leq M$ and $0 \leq n \leq N$, for example. The pixels are then index points of the image as a range over a matrix. By way of example, the index can start at the lower left most pixel of an image as the position (0,0) in a typical coordinate system. One common distance function used is where the difference is defined as: $D(m,n,I,T) = \Sigma_j \Sigma_k [I(j+m,K+m)-T(j,K)]^2$. A template match exists at coordinate location $(m,n)$ if: $D(m,n,I,T)<\lambda$.

Since many templates exist in the database, B(I) is donated as the closest matching template for a database of templates, $F=\{x| \text{ where x is a template}\}$ and is defined as $B(I)=x$, where $x \in F$, and $D(m,n,I,x)$ is a minimum. The matching of the templates is complicated by a number of problems, e.g. shifts, rotational differences or scale differences, when pixel-by-pixel processing is necessary. It is therefore often important to spatially register the two images to correct for these problems. Many techniques are known in the art that deal with image registration. Such techniques improve upon the template matching process.

A number of image matching techniques are known and used in the art. Generally, these fall into three categories:

1) Correlation approach—a traditional approach encompassing signal processing and statistical decision theory concepts.
2) Feature matching approach—whereby pixel-by-pixel intensity variations are ignored in favor of selected measurable features or attributes and relations of an image, e.g. texture or color.
3) Relational matching—where detailed correspondences between the images include geometric relationships between selected components. This provides for modelling of an entire image and leads to more efficient further processing by being able to prioritize the landmarks depending upon their particular semantic significance. See Pratt, W. K., *Digital Image Processing* and Fischler, M. & Firschein, O. *Intelligence, The Eye, The Brain and The Computer* for more information on image matching techniques.

When features are used as a means for matching, various codebooks can be created, each with its own set of features. Thus, the algorithm can choose a codebook depending upon the features of the document and therefore dramatically reduce the search time.

Model-based data compression is also a known concept. In a model-based compression system, certain characteristics of the data to be compressed are presumed or predicted. In a model-based system, ordinarily, an expert studies the characteristics of the type of data, and designs a codebook optimized for the expected data. The information content of the data may be substantially reduced by taking into consideration these characteristics common to a significant portion of the data stream. Therefore, in such a system, it is the difference between the data signal to be compressed and the model or a selected model encompassed by the system which forms the relevant data to be further processed. Of course, if a model completely describes the source data, then the compressed data consists of merely an identification of the model. Various methods are also known to account for deviations from the model which are insignificant, without substantially increasing the amount of information which is necessary in order to describe the source data. Therefore, a model-based system may include one or more models which characterize prototypic data, and an unknown signal is then matched to a selected model, and processed to eliminate information included in the selected model.

It is further known that a large number of images or compressed images may be stored in a storage device. These images may be used as templates for a pattern recognition system, for matching an unknown pattern against the images in the database. The storage medium may be RAM, ROM, EPROM, EEPROM, flash memory, magnetic storage medium, magneto-optic storage medium, digital optical storage medium, holographic image storage medium, an optical storage medium and other known systems. The images stored in these databases may provide a very large number of templates or models against which an image or data pattern is to be matched, and statistical analysis may be used to select a best match.

Automated handwriting extraction from documents and recognition thereof is also known. Handwriting recognition may be used for computer information input. Known optical character recognition systems are available to read and interpret handwriting. Systems are also available to extract handwritten information from electronic images of forms.

Database Management

Merging and coalescing multiple sources of information into one unified database requires more than structurally integrating diverse database schema and access methods. In applications where the data is corrupted, i.e. is incorrect, ambiguous, having alternate forms or has changed over time, the problem of integrating multiple databases is particularly challenging. This is known as the merge/purge problem. Merging information requires so-called semantic integration, which requires a means for identifying equivalent or similar data from diverse sources. The merging process must then determine whether two pieces of information or records are of sufficient similarity, and that they represent some aspect of the same domain entity, by means of sophisticated inference techniques and knowledge of the domain.

A very large database is one in which it is unfeasible to compare each record with every other record in the database, for a given operation. Therefore, a simplifying presumption is necessary in order to ensure the integrity of the data records, such as when a batch of new records is added to the database. In general, this presumption is that a predetermined subset of the database records may be selected in which a cross comparison of the records within the subset will be effective to ensure the integrity of the entire database, to within a reasonable limit.

In the field of mailing list verification, the database integrity is generally ensured by first sorting the database according to a criteria, then selecting a window of consecutive sorted records, and then comparing the records within the window with each other. The purpose is to eliminate duplicate records, so that within the window, records which appear to correspond are identified as such, and an algorithm is executed to select a single record as being accurate and to eliminate any other corresponding records. This known method, however, will not eliminate records which are corresponding and yet are not present within the window. Further, the comparison algorithm may not perfectly identify and eliminate duplicate records. This problem will exist with respect to financial documents, like checks and other items, as well.

Known very large database systems may be maintained and processed on mainframe-class computers, which are maintained by service bureaus or data processing departments. Because of the size of these databases, among other reasons, processing is generally not networked, e.g. the data storage subsystem is linked directly to the central processor on which it is processed and directly output.

Other database processing methods are known, however these have not been applied to very large databases. This is not a matter of merely database size, but rather magnitude. In general, the reason for ensuring the integrity of a mailing list database is a matter of economics, e.g. the cost of allowing errors in the database as compared to the cost of correcting or preventing errors. Of course, when these databases are employed for other applications, the "cost" of errors may be both economic and non-economic. Often, databases are maintained for many purposes, including mailing list, and thus the costs may be indeterminate or incalculable.

The semantic integration problem, see *ACM SIGMOD record* (December 1991), and the related so-called instance-identification problem, see Y. R. Wang and S. E. Madnick, "The inter-database instance identification problem in integrating autonomous systems", *Proceedings of the Sixth International Conference on Data Engineering* (February 1989), as applied to very large databases are ubiquitous in modern commercial and military organizations. As stated above, these problems are typically solved by using mainframe computing solutions. Further, since these organizations have previously implemented mainframe class solutions, they typically have already made a substantial investment in hardware and software, and therefore will generally define the problem such that it will optimally be addressed with the existing database infrastructure.

Routinely, large quantities of information, which may in some instances exceed one billion database records, are acquired and merged or added into a single database structure, often an existing database. Some of the new data or information to be merged from diverse sources or various organizations might, upon analysis, be found to contain irrelevant or erroneous information or be redundant with preexisting data. This irrelevant, erroneous or redundant information is purged from the combined database.

Once the data is merged, other inferences may be applied to the newly acquired information; e.g. new information may be gleaned from the data set. The ability to fully analyze the data is expected to be of growing importance with the coming age of very large network computing architectures.

The merge/purge problem is closely related to a multi-way join over a plurality of large database relations. The simplest known method of implementing database joins is by computing the Cartesian product, a quadratic time process, and selecting the relevant tuples. It is also known to optimize this process of completing the join processing by sort/merge and hash partitioning. These strategies, however, assume a total ordering over the domain of the join attributes or a "near perfect" hash function that provides the means of inspecting small partitions (windows) of tuples when computing the join. However, in practice, where data corruption is the norm, it is unlikely that there will be a total ordering of the data set, nor a perfect hash distribution. Known implemented methods nevertheless rely on these presumptions. Therefore, to the extent these presumptions are violated, the join process will be defective.

The fundamental problem is that the data supplied by the various sources typically includes identifiers or string data that are either erroneous or accurate but different in their expression from another existing record. The "equality" of two records over the domain of the common join attribute is not specified as a "simple" arithmetic predicate, but rather by a set of equational axioms that define equivalence, thus applying an equational theory. See S. Tsur, "PODS invited talk: Deductive databases in action", *Proc. of the 1991 ACM-PODS: Symposium on the Principles of Database Systems* (1991); M. C. Harrison and N. Rubin, "Another generalization of resolution", *Journal of the ACM*, 25(3) (July 1978). The process of determining whether two database records provide information about the same entity can be highly complex, especially if the equational theory is intractable. Therefore, significant pressures exist to minimize the complexity of the equational theory applied to the dataset, while effectively ensuring the integrity of the database in the presence of syntactical or structural irregularities.

The use of declarative rule programs implementing the equational theory to identify matching records is best implemented efficiently over a small partition of the data set. In the event of the application of declarative rule programs to large databases, the database must first be partitioned into meaningful parts or clusters, such that "matching" records are assigned to the same cluster.

Ordinarily the data is sorted to bring the corresponding or matching records close together. The data may also be partitioned into meaningful clusters, and individual matching records on each individual cluster are brought close together by sorting. This basic approach alone cannot, however, guarantee the "mergeable" records will fall in a close neighborhood in the sorted list.

SUMMARY AND OBJECTS OF THE INVENTION

The foregoing and other objects of the invention are achieved herein by a system and method for processing images in the form of, e.g. a financial or standardized type of document, comprising the steps of scanning the image to create a first digital image of the document; comparing the first digital image against a codebook of stored digital images, or features of an image, or information relating objects in an image; matching the first digital image with one of the stored digital images, or features of an image, or information relating objects in an image; producing an index code identifying the stored digital image as having matched the first digital image; subtracting, or filtering or deleting the stored digital image from the first digital image to produce a second digital image; and storing the second digital image with the index code.

Additionally, the invention includes the use of a rule-based system for merging databases containing such financial document images, which declaratively uses an equational theory for ensuring database integrity. Further, according to the present invention, very large databases are accommodated, databases which are so large that parallel and distributed computing systems are preferred for achieving an acceptable performance in a reasonable amount of time with acceptable cost. The present invention preferably employs the so-called sorted neighborhood method to solve the merge/purge problem. Alternatively, a so-called clustering method may also be employed.

More particularly, one aspect of the invention comprises optically scanning personal or corporate checks to produce a digital signal and converting the data, through a model-based or other compression algorithm, to produce a significantly smaller data file, thus reducing the amount of memory needed from, e.g., about one megabit per check to only a few hundred bytes per check.

A standard personal check measures approximately 36 square inches, while corporate checks can vary, for example, from about 20 to 60 square inches. A simple approach to scanning with high resolution (600×600 dpi) can therefore lead to an image requiring a minimum of one megabit of information per check. The present system, however, employs a model-based image analysis and compression system, which separates and extracts a variable foreground portion of the check from a form or background portion of the check, matches the form portion with one of a plurality of stored templates to allow substantial compression by representing the background as merely a simple identifying code. The system optionally determines an error between the matched stored template, determines whether the error is not significant, and ignores the error if it is insignificant and subjects the check image to further processing if the error is significant. The foreground image, separated from the background image and compensated for error, is further subjected to an optimal compression adapted to the particular type of information, e.g. handwritten or printed. Alternatively, the invention also comprises a method that does not involve a first determination of form portion and variable portion (or background and foreground) but rather seeks the existence of a match with the template, using an algorithm which is tolerant to the existence of a variable portion. Either way, the compressed information according to the present invention will have an information content significantly smaller than the original, complete scanned image, which can be, e.g., about a few hundred bytes, or less.

The standard check image compression systems heretofore known, however, produce files having an information content of at least about 40 kilobytes or more at a lower resolution than 600 dpi.

By processing the checks early in the chain of collection events, while extracting all of the necessary information from the check, the present system eliminates the requirement of physically sending the paper check from place to place after conversion, reducing the possibility of errors at the various subsequent points. Therefore, once a check is properly scanned and the integrity of the data ensured, the paper original may be destroyed or, at a minimum, may be stored remotely from the location of the collection and settlement process. In fact, trader the present invention, the stored compressed digital image can, and should replace the paper check, and therefore the paper check can be eliminated entirely thereby preventing fraud through duplicate processing or doctoring of paper media.

The present system therefore allows the "truncation" of a paper check into an electronic image form. This allows the transfer of reliable and secure information between the various parties without need for the physical transfer of paper. Security of the digital data may be ensured by various encryption methods, e.g. public key/private key systems, digital signature standard, digital encryption standard and other known secure encryption systems. The electronic message may also be time stamped. The paper check may be truncated at any of a number of points in the processing chain. The check may be truncated by the payee, through use of a device which, in a secure and reliable manner, scans the check image and destroys or permanently defaces (or stores remotely) the original. In a lock box operation, where the payee has an agent to collect payments and process them, the operator of the lock box operation may also truncate the checks, and transmit the information to the appropriate financial institution, as well as the contracted party or any other interested party. The check may also be truncated at the payee's bank, where the payee presents the check for deposit. In this case, the security is less important, although the integrity of the system depends on a fail-safe system. The central clearinghouse may truncate the paper check, either before or after processing. This clearinghouse may also include a special check truncation unit, as a function thereof, and the truncation need not be a part of the existing clearinghouse infrastructure. The payor's bank may also truncate the check, although some of the advantages provided by aspects of the present invention may not be fully achieved. Finally, the payor may truncate the check saving substantially the cost of mailing back the checks to the originator.

The memory reduction facilitated by the present invention is done by separating the background of the check, i.e. the check style information, from the personalized, foreground information, i.e. the handwritten, post-printed or added portion. In some cases the background information may include preprinted signatures or other identifying information, e.g. corporate or private names and addresses. Once the background information is determined or defined, it is maintained in a library and only an index code associated with that background need be maintained with the foreground, personalized information to represent a check image. The background can then be deleted or eliminated from the stored check information (except for the identifying code), thus reducing the amount of memory required. In some cases the identifying code may be represented implicitly, therefore eliminating it entirely from the stored information. Thus, the invention includes, as a feature, the creation and maintenance of a codebook library of scanned check information, in a suitable storage form, e.g. actual image or compressed image data of various resolutions, that can be used to regenerate the actual image data, through the use of an algorithm executed by a computer or a series of mathematical equations that can compare the features and relationships (e.g. geometric) between the codebook and the actual regenerated image. Where the code has been eliminated and is only implicit within the rest of the stored image, the computer algorithm can regenerate the actual image through this implicit knowledge. By way of example, if the issuing bank only uses one background for all their checks, by the algorithm knowing the issuing bank, the algorithm implicitly knows the background without need of a code.

The present system also includes a system for positively identifying the background image of a check through a code contained thereon, which may be a zebra code, bar code, two-dimensional code, numeric or alphanumeric code, invisible optically readable code, or magnetic readable code. This code allows the easy access of a corresponding image of a blank check form from a storage medium, which allows easier identification of the added information on the foreground through image subtraction, and provides positive identification of the check style. While it is not necessary to provide the image stored in a database, providing such an image will allow the verification of the image code and allow the identification forgeries and frauds. The preferred storage medium, where a search of the entire database to determine the existence of a match is CD-ROM, which allows the cost effective storage and updating of a large number of check forms.

When a background subtraction of a check form is accurate, the remaining information on the check may be compressed to about, e.g. 1,000–2,000 bytes of information or possibly smaller depending upon the amount of foreground information. Further, if a model-based algorithm is employed on the added information, such as splines or wavelets representation of the handwritten or an optimized compression of the post-primed information, only a small amount of information, e.g. the spline control points need to be stored, and the entire check may be represented diminimously, as, for example, a few hundred bytes of information. See *Three Dimensional Graphics*, Chapter 21, "Curves and Surfaces", pp. 309–330.

When identifying coding of the checks is not available, a pattern recognition system can be employed according to the present invention to match the background image of a check being processed with a database of available images of check backgrounds. In such an instance, it is preferred that the image being analyzed be preprocessed, i.e. subjected to an early stage analysis, to determine certain characteristics thereof. The images in the database are indexed according to similar or identical characteristics or criteria. Therefore, early in the processing of a check, it is possible to define a subset of the database which possess corresponding characteristics to the check. This preliminary matching procedure may be conducted for a number of different characteristics, and may be conducted in parallel by a number of processing units. Thus, a small subset of the overall database of templates, having characteristics closely matching the check being processed, may be defined for further processing. It is preferred that only a small number of images be retrieved from the database for direct comparison or cross correlation with the check image, because of the need to maintain high throughput and because of the high computational expense of the image pattern matching operation. In order to keep the size of the database to reasonable proportions, a compressed version of the image may be maintained. When the compressed image is retrieved, some preprocessing may need to be done to decompress the image before attempting to compare or cross correlate it to the check image.

The system according to the present invention preferably employs to full advantage any clues provided on the check as to the identity of the form, such as the preprinted codes referred to above, an identification of the manufacturer of the check, information relating to the manufacturing or printing process employed in making the check, and other information that may limit the available choices of check type, e.g. account number or customer identification that may be associated with check types that is typically used by that customer as may be learned by a computer system. Further, the processing is preferably time limited, so that after a predetermined period of time, the matching processing ceases and the check is represented as a compressed image based on the image data and the processing performed in the matching process. If the processing is prematurely terminated, that check may optionally be later processed by an exception handling system. Further, in cases of an incomplete match, a check may be described by its relation to other templates or portions of templates in the database, which may be described in a smaller number of bytes than a non-model based de novo description. In addition, a check image may also be described in relation to combinations of transforms applied to defined patterns or portions of other available images in the database.

Many checks have a repetitive texture or pattern in the background region. These repetitive background patterns lend themselves to efficient compression and/or analysis using Fourier coefficients, wavelets, fractal (iterated function system) transforms, and/or spatial pattern analysis. Such processing is expected to greatly reduce the amount of relevant data, while retaining information necessary for reconstructing the check image, even if a full background template matching function is not completed on the check.

The present system for scanning checks may be advantageously employed with a fraud detection system. The scanner preferably has a high resolution, e.g. between 300–800 dpi to produce resultant images of very high quality. Certain new check styles include finely printed information in, e.g. 1 point type, which cannot be scanned using normal scanning equipment, for the purpose of preventing electronic copies or forgeries. The present system may scan the entire image at extremely high resolution, in order to properly detect this information. After data compression, the results of such a high resolution scanning system will be small. Subtle variations and "flaws" may thus be detected in the check background. Therefore, if such flaws are intentionally placed by the manufacturer, the image contained on the database could include an identification of these "flaws", which would be searched for on the checks being scanned. Thus, a match would also determine the authenticity of the check form, thereby thwarting certain types of frauds. Likewise, any checks which are scanned are analyzed for the presence of artifacts not present on authentic documents. These may be present due to falsification of the document. Therefore, the present system may assist banks in detecting and preventing fraudulent transfers. It is noted that certain kinds of flaws may only reasonably be detected through an electronic analysis, and therefore the present system allows new, enhanced methods for ensuring the integrity of the system.

The present system preferably analyzes the foreground information on a check in order to ensure the availability and consistency of necessary information on the check prior to passing through the check clearing process. Thus, missing information may easily be detected. Further, inconsistency between the courtesy figure (e.g. dollar amount in decimal) and written amount on the check may be detected.

The prior art teaches the sorting and searching of databases. See Gotlieb & Gotlieb, *Data Types and Structures*, Chapter 4, 97–155, Prentice-Hall (1978).

Prior art teaches parallel processing and parallel operations. See U.S. Pat. No. 4,860,201, Binary Tree Processor and U.S. Pat. No. 4,843,540, Parallel Processing System, both to Salvatore J. Stolfo.

However, the prior art fails to teach techniques that can be employed successfully for managing large databases of financial document image information.

It is thus an object of the invention to create a system, method and apparatus for creating and using a codebook of data images or features or relationships of financial instruments or standardized documents, scanning a negotiable or other instrument, producing an image, comparing the scanned image against the codebook, subtracting the codebook image information from the scanned image, compressing the left over handwritten or post-printed information, and taking the final reduced product and storing and/or processing same in accordance with banking procedures.

It is also an object of the invention to employ parallel processing techniques to accelerate the processing of an individual matching operation, comparison of an unknown object against a set of codebook templates in parallel, and the processing of a multiplicity of unknown images in parallel.

It is a further object of the present invention to substantially reduce the storage requirements and management of large archival storage of many check images and to improve the speed of accessing and retrieving individual check images and the long term storage requirements of older existing microfilmed check images, which are typically maintained by the banking system for about 7 years.

It is another object of the present invention to provide variable-size or scaled check images retained on storage media, including decompression by utilizing codebook code to render full color and faithful reproductions of archived check images.

It is an object of the present invention to provide a method for identifying duplicate records in a database of financial document images, each record having at least one field and a plurality of keys, comprising the steps of sorting the records according to a criteria applied to a first key; comparing a number of consecutive sorted records to each other, wherein the number is less than a number of records in said database and identifying a first group of duplicate records; storing the identity of the first group; sorting the records according to a criteria applied to a second key; comparing a number of consecutive sorted records to each other, wherein the number is less than a number of records in said database and identifying a second group of duplicate records; storing the identity of the second group; and subjecting the union of the first and second groups to transitive closure. The selection of keys can be specific to particular backgrounds sought to be subtracted, thereby enabling background image subtraction to occur after sorting.

It is a further object according to the present invention to provide a method of merging two tables of records of financial document images, each record having a plurality of fields, comprising the steps of computing a first key for each record in each table by extracting at least a portion of a first field; sorting the records in each data list using the first key; comparing a predetermined number of sequential records sorted according to the first key to each other to determine if they match; storing identifiers for any matching records; computing a second key for each record in the table by extracting at least a portion of a second field; sorting the records in each data list using the second key; comparing a predetermined number of sequential records sorted according to the second key to each other to determine if they match; storing identifiers for any matching records; and subjecting the union of said stored identifiers to transitive closure.

According to the present invention, a further aspect includes a method in which at least one of said comparing steps comprises applying a rule-based equational theory to the records.

It is also an object of the present invention to provide a method including a step of eliminating all but one of any duplicate records from said database based on said transitive closure.

It is a still further object according to the present invention to provide a method in which the step of initially partitioning the records into clusters involves using a key extracted from the records.

A still further object of the invention provides for computing a first key step comprises scanning clusters of records in sequence, and for each scanned record extracting an n-attribute key, which is mapped into an n-dimensional cluster space.

Another object according to the present invention provides a method wherein the comparing step comprises comparing the records according to a characteristic selected from the group consisting of edit distance, phonetic distance and typewriter distance.

Another object according to the present invention provides for selecting a key from the group consisting of last name, first name, address, account number, social security number and telephone number.

Still another object according to the present invention provides a method further comprising the step of preprocessing the records in the database using a thesaurus database to indicate relatedness. The thesaurus database may include linked records indicating related names and nicknames in a plurality of languages. The preprocessing step may also include the step of employing a spell checker to correct misspellings in the records. The spell checker preferably includes the correct spellings of known cities, and is employed to correct the spelling in a city field of a record.

Another object according to the present invention provides a parallel processing method in which a separate processor is employed for comparing a predetermined number of sequential records sorted according to the first key to each other to determine if they match, and an additional processor is employed for the comparing a predetermined number of sequential records sorted according to the second key to each other to determine if they match. The database is preferably sorted in parallel using parallel merge sorting.

A further object according to the present invention provides a method, wherein: N is the number of records in the database, P is the number of processors, each processor p, $1 \leq p \leq P$, being able to store $M+w$ records, where w is the size of the merge phase window, and M is a blocking factor, P is less than N, MP is less than N, and $r_i$ represents record i in a block, $0 \leq i \leq MP-1$, comprising the steps of dividing the sorted database into N/MP blocks; processing each of the N/MP blocks in turn by providing each processor p with records $r_{(p-1)M}, \ldots, r_{pM-1}, \ldots, r_{pM+w-2}$, for $1 \leq p \leq P$, searching matching records independently at each processor using a window of size w; and repeating the processing step for the next block of records.

A still further object according to the present invention provides a method wherein N is the number of records in the database, P is the number of processors p, and C is the number of clusters to be formed per processor p, comprising the steps of dividing the range into CP subranges; assigning each processor C of the subranges; providing a coordinator processor which reads the database and sends each record to the appropriate processor; saving the received records at each processor in the proper local cluster and after the coordinator finishes reading and clustering the data among the processors, sorting and applying the window scanning method to the local clusters of each processor. The coordinator processor load balances the various processors using a simple longest processing time first strategy.

A further object according to the present invention is to provide an apparatus for identifying duplicate records in a database, each record having at least one field and a plurality of keys, comprising a storage medium for storing said records of the database; a connection system for selectively transmitting information from the database; and a processor having a memory, said processor receiving information from said connection system, for sorting the records according to a criteria applied to a first key; comparing a number of consecutive sorted records to each other, wherein said number is less than a number of records in said database and identifying a first group of duplicate records; storing the identity of said first group in said memory; sorting the records according to a criteria applied to a second key; comparing a number of consecutive sorted records to each other, wherein said number is less than a number of records in said database and identifying a second group of duplicate records; storing the identity of said second group in said memory; and subjecting the union of said first and second groups to transitive closure.

Further objects and features of the invention will become apparent from a review of the figures and detailed description of the preferred embodiments, set forth below.

BRIEF DESCRIPTION OF THE DRAWINGS

The preferred embodiments will be explained by way of the drawings, wherein:

FIG. 10 is a graph of the ideal performance of the method according to the present invention;

FIGS. 12A and 12B are two graphs of time results for the sorted-neighborhood and clustering methods for different size databases;

DETAILED DESCRIPTION OF THE PREFERRED EMBODIMENTS

Financial Instruments

Figure 1:
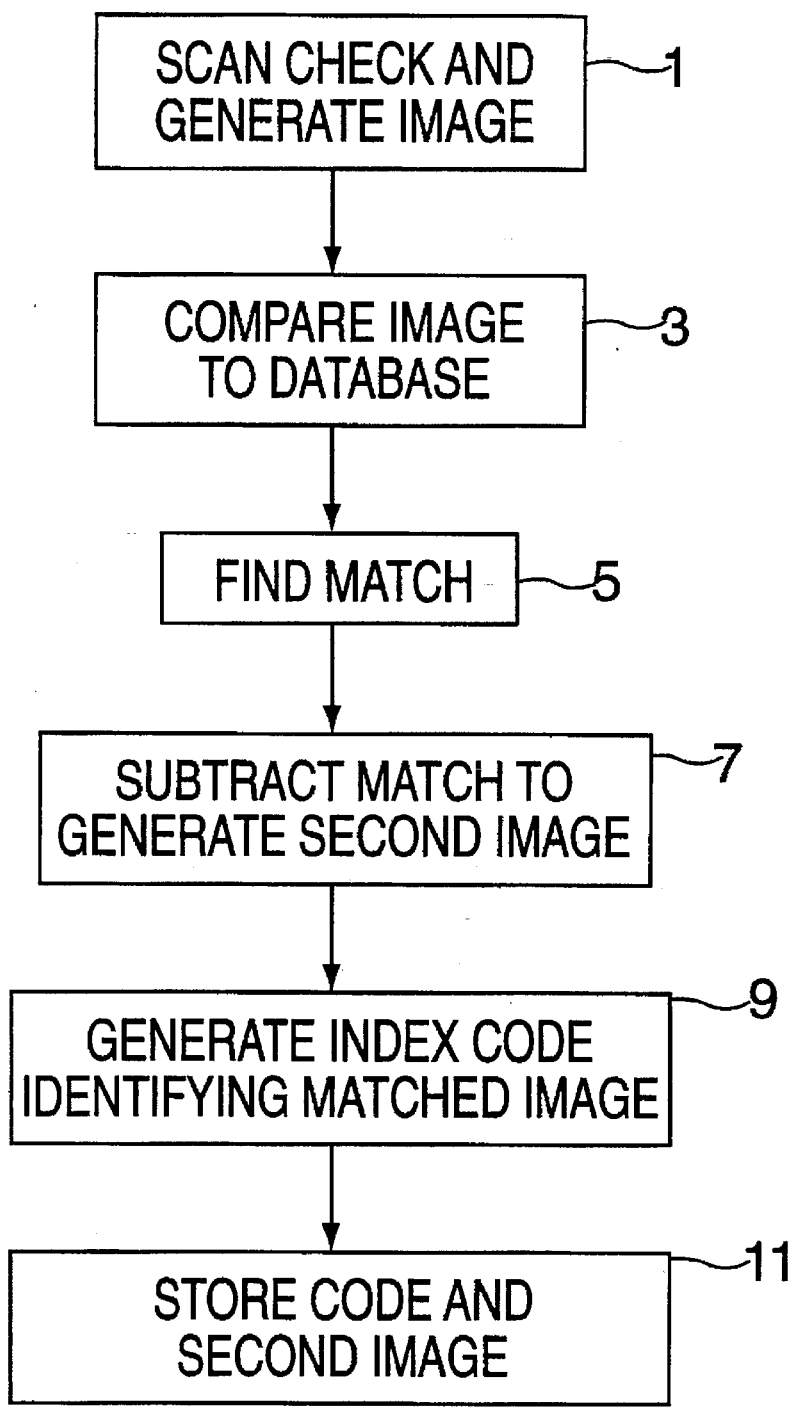
FIG. 1 is a flow diagram of an overall methodology of a system operation in accordance with a first embodiment of the invention.

In FIG. 1, the overall system architecture of logic is set forth in accordance with a preferred embodiment of the present invention. Box 1 sets forth the first stage of the process, wherein the check (or other document or instrument, as the case may be) is scanned and a scanned image, reflecting the check, is created and stored. It is understood that any of a number of known hardware scanners can be utilized for this purpose, and any of a number of known software packages can be used to scan and store the scanned information. A preferred scanner has a resolution of 600×600 dpi, 6 to 8 bits of gray scale or 18–24 bits of color information, with a selectively engageable increased resolution mode of around 2400×2400 dpi or higher for areas of increased detail. The increased resolution mode is employed when high resolution detail is expected in a portion of the image, as predicted by a matched template or model, and for capture of, e.g., the signature. Thus, the high resolution selective scanning may be performed as a post-template matching operation, preferably using different scanning hardware. As a consequence of the limitations of current technology, such high resolution is not used to capture the entire image because of the large amount of data which would be produced, and because of the slow speed, decreased reliability and sensitivity to artifacts of such scanners. As technology improves, it is presumed that the application of such technology will be included within the scope of the present invention. It should be appreciated that the techniques according to the present invention have are independent of the resolution of the scanner and reproduction device, and can employ the most currently available technology based on the application demand.

Further, after enough scanning 1 is completed for an image to be recognized, comparing 3 is next initiated wherein the image resulting from scanning 1 is compared against a codebook database, and a match 5 is found. By matching, it is understood that a mathematically significant overlap in image between the scanned image and the stored image is sought. In other words, identity is not necessarily required in order for the match to occur, but rather known techniques can be used to determine a best match. A match will be considered so long as the pixel range between the scanned image and the stored image is within some threshold lambda ($\lambda$). Of course, the matching system may also compensate for possible transforms, such as slight stretching, skewing, bowing or other alterations which would prevent an absolute match yet are possible under normal circumstances. A check image which can be matched, yet contains a significant difference from the template is handled by an exception handler, possibly in a separate operation. Such exceptions, expected to be rare occurrences, may be considered manually, or be subjected to more extensive automated scrutiny.

Alternatively, matching can be performed by computing some feature of a patch or portion of the unknown image, and then matching this extracted feature against a codebook of templates. The templates themselves represent features and any other identifying information to allow for matching. An image feature is a defining characteristic of an image, which therefore may define different or distinguishing image types. Alternatively, one may design a plurality of distinguishing features of an image, each with some appropriately defined identifier, like an image type and at least one feature. The plurality of such features may be represented as a structured record associated with an image. Matching may be performed on this record of features or a portion thereof. Accordingly, the invention teaches the creation of a database having a plurality of records, wherein each record has unique elements comprising an identifying code and a collection of identifiers that distinguishes one record from another. Thus, the image type and feature can be compared against the identifying code and collection of identifiers in the database.

By way of example: natural features would correspond to certain obvious characteristics that a viewer of the image would recognize, e.g. color, grain, etc. Artificial features would be the result of a mathematical manipulation of the image, e.g. histograms of pixel luminance, amplitudes, and frequency spectra in some spatial region.

The matched codebook data image is next subtracted (subtract match 7 in FIG. 1 ) from the scanned image. By subtraction, it is understood that any of a number of techniques can be used to filter or compress the amount of information that comprises the stored image, and need not actually involve full, and complete arithmetic subtraction. Further, the separation of the codebook data image from the scanned image may be totally separate from the codebook matching operation. For example, if a check background is light blue with a darker blue pattern, then the background may be separated by means of a simple color filter which is not dependent on the background pattern. Further, preprinted information may also be separated in like manner, by filtering for straight lines and other expected features or objects on a check.

Thereafter, a code is generated in element 9 identifying the matched image in the codebook. By generated, it is understood that within the codebook each stored template is represented by a code, which uniquely identifies the template. This code may be a binary integer or other type of index.

After matching the scanned image with a stored image, the separated foreground image information is stored linked to the codebook identifier of the separated background image. In this manner, the entire, original scanned image can be reproduced, while the storage of this image is significantly reduced in spatial, storage requirements. The foreground image preferably undergoes further processing in order to reduce the information storage capacity necessary. This compression may be performed by further reference to a codebook, for primed information, or by other types of image compression for e.g. the handwritten information. All of the information contained in the check image is stored in linked fashion, which may be physically adjacent, or otherwise mathematically related.

Figure 2:
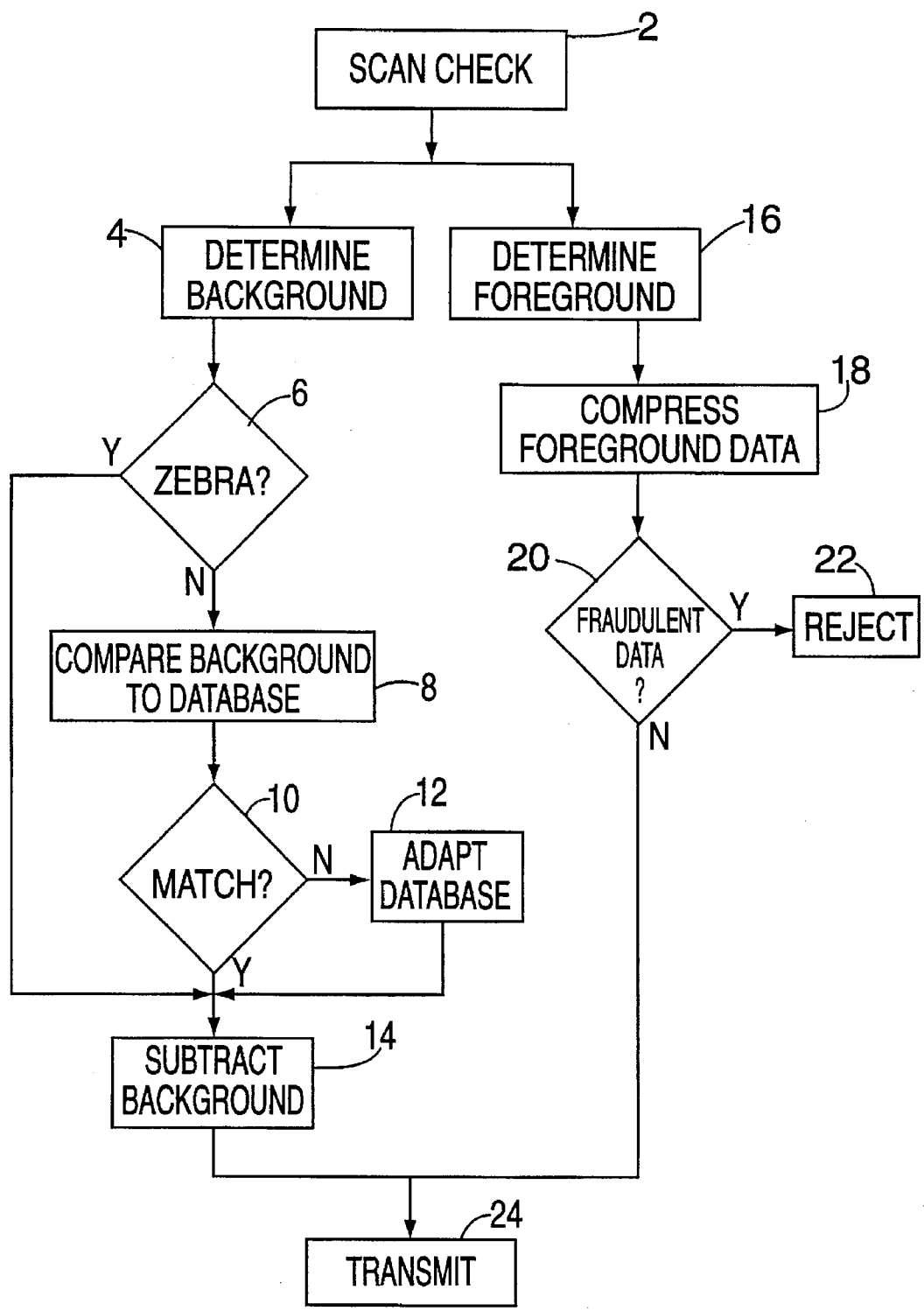
FIG. 2 is another flow diagram of an overall methodology in accordance with a second embodiment of the invention.
Figure 3:
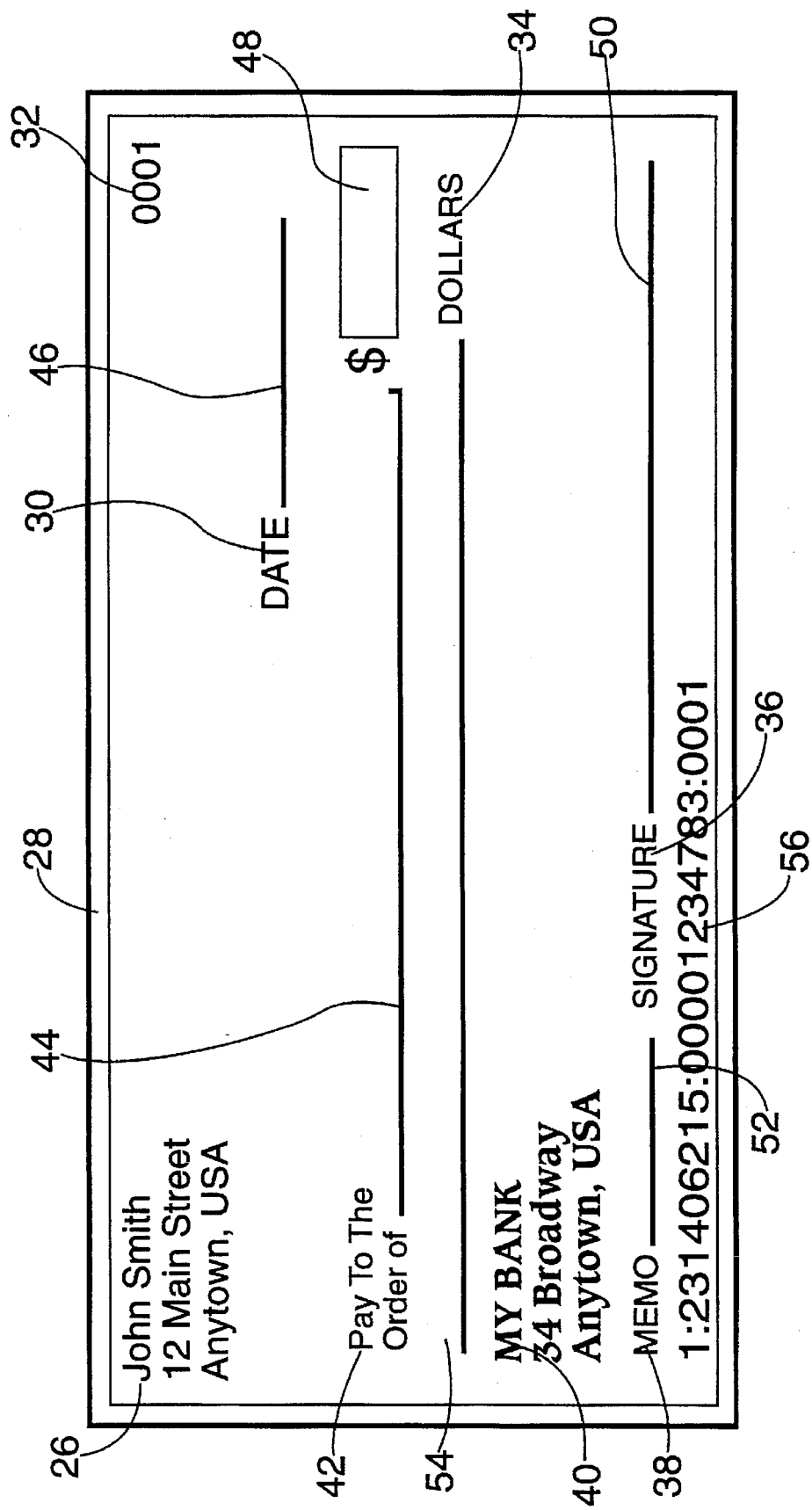
FIG. 3 is a layout diagram of a typical check containing preprinted information.
Figure 4:
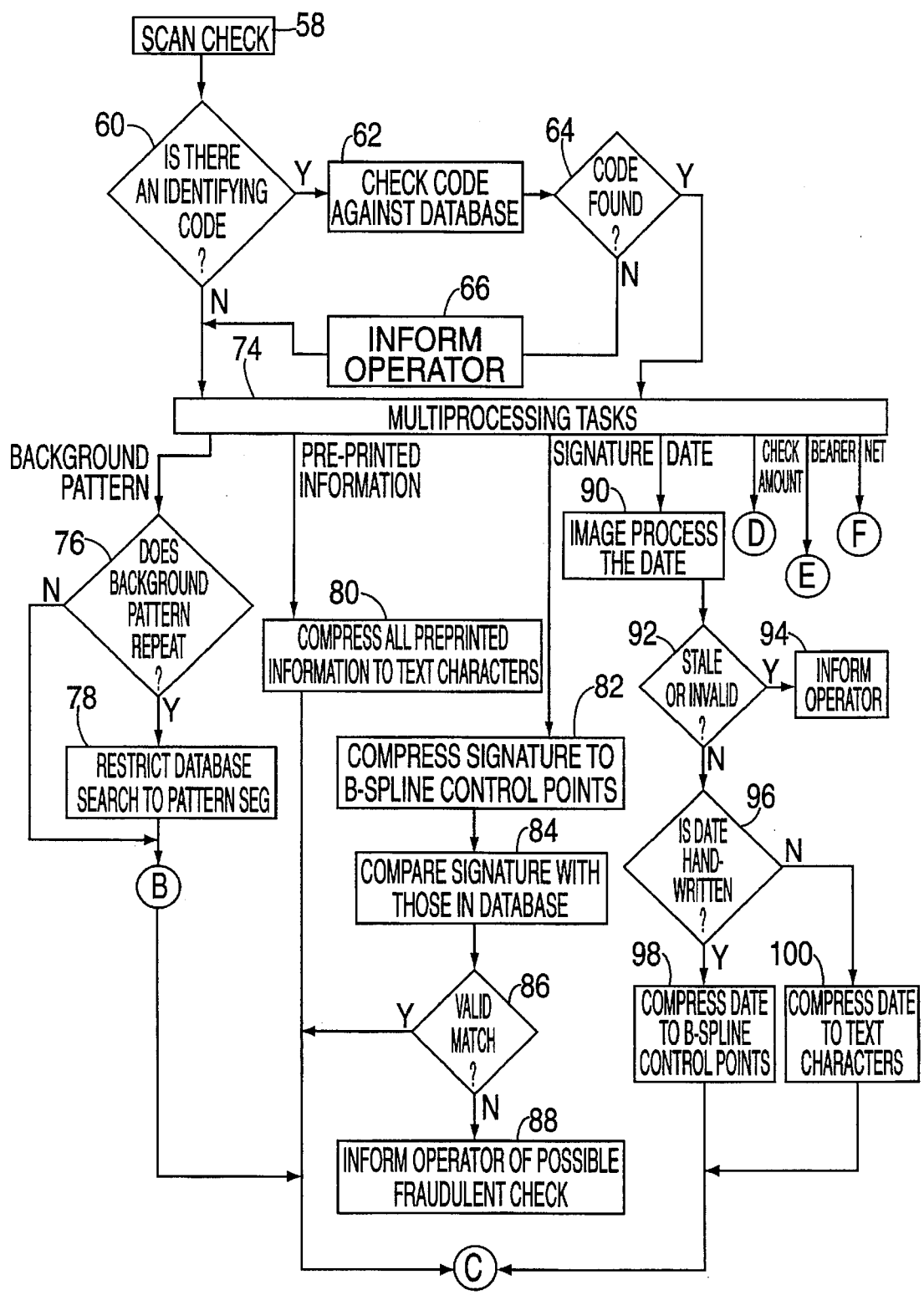
FIG. 4 is a detailed flow diagram of the embodiment set forth in FIG. 2.
Figure 5:
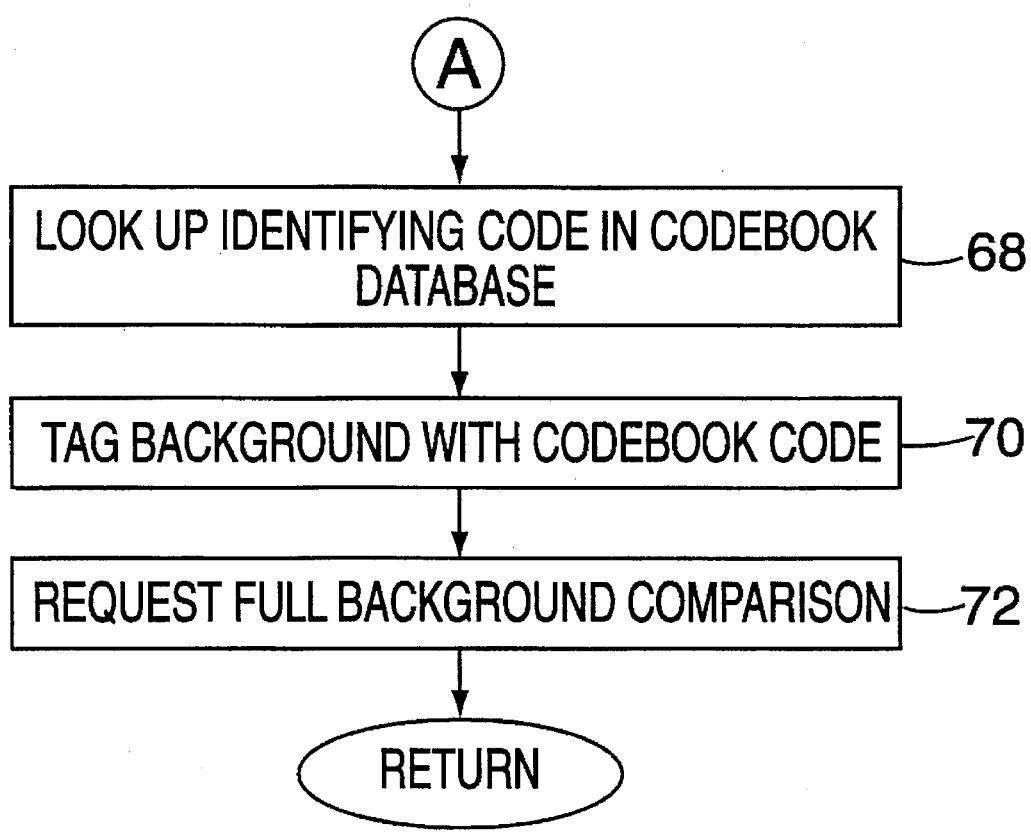
FIG. 5 is a sub-flow diagram of the portion "A" of the flow diagram of FIG. 4.
Figure 6:
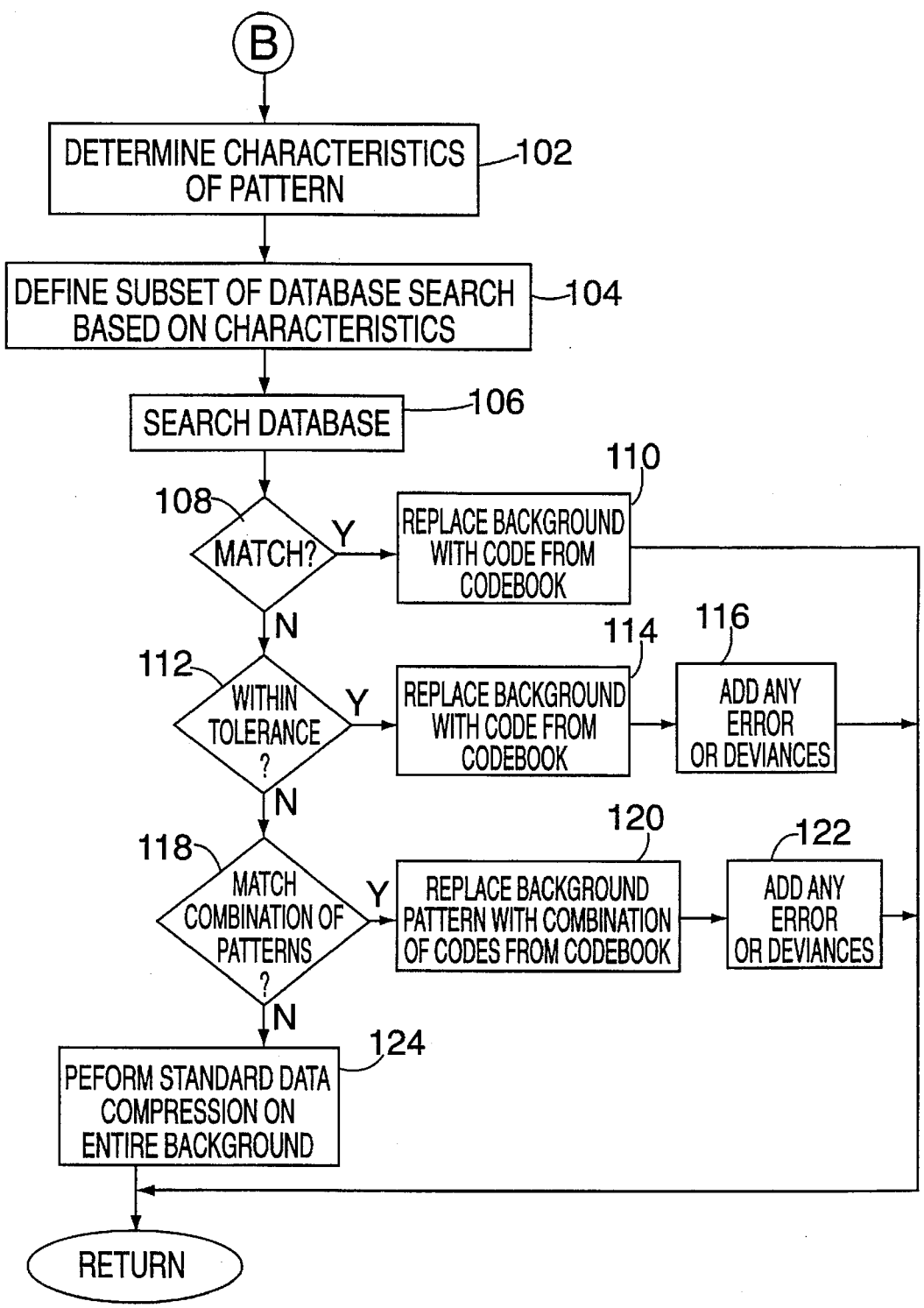
FIG. 6 is a sub-flow diagram of the portion "B" of the flow diagram of FIG. 4.

FIG. 2 shows an alternative embodiment of the invention. The maker's check is scanned in by a scanning device 2, which may be a commercially available device for the purpose, and converted into a digital image stored in the processor's memory. The processor first scans the check image for the presence of an identifying code which uniquely identifies the check form and/or preprinted information on the check. The preferred code is a zebra code or two dimensional code. Optionally, the foreground image may be first separated from the background using standard image processing techniques before the code detection occurs. In such a case, the processor divides the check image into various regions, which may be overlapping, and begins to look at the various regions of the scanned image. The processor then separates the foreground from the background in the region of the image which it is processing. On a pixel-by-pixel or cluster of pixels level, the processor determines whether the part of the image that it is currently analyzing is part of the background 4 of the image or of the foreground 16 of the image. When the foreground obscures the background, the processor optionally interpolates the background, or generates a mask of the foreground image which is ignored or processed separately from unobscured background. Determining that the processor is looking at the background, it then checks the image for a zebra code 6 or some other such similar code as set up by the financial industry or check manufacturer. If there is no such code, the processor must compare the background to the database or codebook 8 to ascertain whether the check has a known background. Upon finding a match 10, the processor can subtract the background 14 from the image, replacing it with a code from the library. If the match is not exact, but within a certain range of matches, the background can be subtracted or filtered with the residual differences coded as additional information in the composite compressed image.

If no match is found, the processor preferably takes steps to update the adaptive database 12 to add this new background to the database and create a new code for it. The new background must be transmitted to a central repository so that a receiver of the coded image data may decode the background. Thus, upon encountering a new background which passes exception checks, the image is forwarded to a central clearinghouse for addition of the database and appropriate indexing and processing. This new check background image will be included in an update release of the database. Upon receipt of the new background, the clearinghouse first checks it against its own, more updated, database, and will return an appropriate code to the processor if one has been previously assigned, or assign a new code if none exists. In the absence of feedback, the new check will be stored as a compressed image according to known techniques.

After determining the background code, the processor can subtract off this now known background from the check image 14. If a zebra code was initially found 6, then the background can be immediately identified and subtracted off 14 replacing it with the code from the database library.

In the preferred embodiment, simultaneously with the comparison by the processor of the background for a match with templates in the database 8, a determination of a foreground area of the image 16 can be made by standard filtering techniques, with subsequent compression of this portion of the image area 18 using standard compression method techniques selected for this purpose. While the check image is being processed, all of the data of the check must be analyzed to detect indicia of fraud or irregularity. This preferably occurs after the background has been identified, so that the analysis may take into consideration the matched background image. This analysis may take place concurrently or subsequent to other processing of the check. The foreground is checked for any fraudulent indications 20 such as an invalid signature or an improper amount. If any fraudulent indications are found, the check is rejected 22, and is subjected to exception handling, which may include, e.g. notification of the bank operator.

After the background data has been subtracted out and the foreground data has been compressed with no fraudulent indications, the remaining image is then transmitted 24 to either the payor's bank or an intermediary clearinghouse.

In another embodiment, the paper check is written either as a personal check or as a corporate check by the originator and given to the depositor for payment. A personal check is typically 36 square inches, printed on quality non-bonded paper with a weight between 20 and 28 pounds. The size of a corporate check, will range, for example from 20 to 60 square inches of the same quality as the personal check. Typically, the front of the check will have some sort of background pattern, whereas the back of the check may or may not have a pattern. The front pattern may be one of a repeatable nature, of a random configuration, or of a picture. The back of the check will generally have a random or repeatable pattern.

The different parts of a typical check are as annotated: 26 represents the payee's personal information, i.e. name, address, telephone number; 28 is the preprinted border surrounding the check; 30 is the preprinted word "Date"; 32 is the sequential number of the check (same number that is part of the magnetically printed information; 34 is the preprinted word "Dollars"; 36 is the preprinted word "Signature"; 38 is the preprinted word "Notes" or "Memo" or some other such notation indicating that this is the area to write a general comment concerning the nature of the check; 40 is the name and address of the bank that the check is issued against; 42 are the preprinted words "Pay to the Order of"; 44 is where the maker indicates to whom the bearer or depositor of the check is to be; 46 is the area where date of issuance is placed; 48 is the area where the maker writes in the courtesy figure (numerical amount in decimal) of the check; 50 is the area where the maker or makers of the check must sign the check; 52 is the area that the maker or bearer may write any memo or notes as to the nature of the check; 54 is the amount that is to be drawn from the check, written in alpha-numerical symbols; and 56 is the magnetic information of the bank, including the bank code, payor's account number, and check number, printed in OCR font (the so called MICR line). Elements 26 through 42 are all preprinted information supplied by the printing company. Elements 44 through 56 are areas on the check that will be filled in by the maker or bearer of the check. The date 46, courtesy amount 48, and the alpha-numeric check amount 44 can be typed in by the maker, whereas the signature 50 must be handwritten (or a stamp of a handwritten signature). The note or memo area 52 is optional and need not have anything in it. All other foreground areas should be filled in.

The check is then delivered to the depositor's bank for verification and processing. At this point, according to the present invention, the check is scanned into the system for pattern recognition and electronic processing 58. In order to insure completeness and enhance the check fraud detection, both the front and the back of the check need to be scanned in. In addition, the reverse side of the check normally includes the endorsements, which are part of the information which must be captured from the check. Sophisticated imaging systems, e.g. systems incorporating advanced features, are not required for the scanning process. Rather, a standard stand-alone imaging system, including an Intel 486 or Pentium PC, CD-ROM drive (preferably 4× or 6×), with a scanner or "scanning fax" interface. Data communications may be implemented through standard telecommunications interfaces, e.g. v.32, v.32bis, v.34, switched 64 DSU, fractional T1, T1, T3 or ISDN systems. While it is preferred that the check data be completely read in a single pass, in low production environments, the check may permissibly be scanned into the system multiple times to ensure that it is read in correctly. Alternatively, if the check is read in multiple passes, these be performed in series, allowing high throughput. This initial complete imaging is important because once the scanning device determines that the check has been scanned in correctly, the actual paper document may be destroyed, leaving only the scanned image of the check. In fact, it is preferred that once the electronic data is authenticated and verified, the paper check is destroyed, to ensure that the check is only processed once.

Prior to, or after scanning the check, the operator may run a magnetic scanner across the magnetic code 56. This will give the system information such as the issuing bank, bank account number and number of the check.

A preprocessor will look at the scanned image of the check for "zebra" coding or any other type of identifying code on the check in order to identify the background of the check as a particular type 60. This will indicate what the background is and from which printing company or source the check originated. Since the entire image will be scanned in at about 300–600 dpi, the zebra code itself may be made unobtrusive to the naked eye. Further, the zebra code may be printed in a fluorescent or invisible ink, and scanned using a laser or other excitation source. The code is checked against a database of codes from the various banks to determine the type of background 62. Although the database can reside in any number of storage devices, the optimal distribution format for cost and ability to easily and inexpensively update is a CD-ROM.

If the database is stored on a media which requires physical access of stored data, then certain methods may be used to improve the apparent access time over the average or worst case access time. See, Lippman, A. et al., "Coding Image Sequences for Interactive Retrieval", *Communications of the ACM*, 32(7):852–861 (1989); Yu, C., et al., "Efficient Placement of Audio Data on Optical Disks for Real-Time Applications", *Communications of the ACM*, 32(7):852–861 (1989). In order to maintain the speed and efficiency of the system, the CD-ROM database must be segmented into various "bands", e.g. groups of database records which are accessible, from a starting position, more efficiently than database records outside the band. Thus, a number of the database records in the band may be accessed in a short period, or one of a predefined group of records need be accessed. The band is preferably a spatially defined region or series of regions of the storage media, but may be interspersed over a large area with an optimization for access based on a parameter other than spatial distance. In a preferred embodiment, a band includes background images or patterns which have similar characteristics, which are to be searched in a particular pattern matching operation. These patterns are stored on a rotating storage (e.g. magnetic, optical or magneto-optical) medium at a range or radii, e.g. on adjacent tracks of the storage drive. This arrangement minimizes read head movement and repositioning during access. Likewise, in semiconductor memory, linked or related information may be stored in the same page frame to increase retrieval efficiency.

If deciphering the bar code or zebra code requires reference to a pattern template database, it is preferred that this database contain information which is banded together for quick and easy access.

In a preferred embodiment, an initial preprocessing of the scanned image determines a characteristic of the scanned image. This characteristic corresponds to a group of check templates representing the subset of check types which possess the given characteristic. Therefore, after the image is processed for a characterization and identification of a first characteristic, a database subset may be defined which includes the possible matches. Of course, the preprocessing may produce an identification of a number of different characteristics, each corresponding to a different subset of the database. This preprocessing preferably occurs without reference to records stored in the database or only to information stored in a cache for fast retrieval. This preprocessing simplifies the pattern matching task which is required to positively identify the check. In the case of a zebra code or other unique check identifier, this preprocessing completes the entire task of identifying the check. However, even an extraction from the check form of the identity of the manufacturer will greatly reduce the computational complexity of the task.

After a database subset of possible matches is defined, the possible matches must be excluded or determined to be true, however the early identification of a true match will, of course, eliminate the need to exclude all others. Therefore, the images should be compared in order of likelihood of a match. This likelihood may be derived from the popularity of a given pattern, either nationally, locally or for a given system, a statistical likelihood of a match based on parameters derived in the preprocessing phase, a linkage of a check type or pattern to a customer's account or other criteria.

It should be noted that in a high throughput system as might be found in a large financial institution, it is preferred that the database access not impede the throughput of the scanning/recognition system, nor that computational resources be under utilized based on a large disparity between peak processing power required and minimum utilized. Thus, after the preprocessing, and during the database access phase, a second check preprocessing operation may be commenced, while the first remains in a queue. Thus, since the storage media access is generally slow, the processor or processor system, which may include a plurality of processors in a symmetric or asymmetric parallel processing array, may divide the check image compression task into a number of segments, each segment to be processed when all of the necessary data is available, yet making the processing resource available to other tasks when the necessary data is unavailable.

It is noted that, in the case of new check types or aberrations, a match will not be possible from a published database. It is therefore preferred that, while the preprocessing and image matching processing is in profess, the check image simultaneously be subject to a compression algorithm that does not require an exact match. This image compression preferably makes use of the results of the intermediate calculations and data structures, if this is efficient, thereby reducing the additional computational load for performing this alternate compression. Thus, the preprocessing characterizations and pattern matching results may also be used to help provide a description of the check sufficient to fully describe the information content thereof, albeit in a manner less efficient than if a code referring to an exact match is found. However, under certain circumstances, a standard compression method may be more efficient than employing intermediate results of the pattern matching algorithm, and therefore is preferably employed. Because of the computational complexity of the pattern matching, and therefore the large amount of processing power which must be available to perform this operation (if zebra codes or other information which simplify the pattern matching task) are not available, the check image may be compressed in a number of ways using these computational resources and the most efficient result, e.g., smallest compressed data file, or alternatively, highest quality image, retained. This image compression preferably occurs simultaneously with the pattern matching, so that a finite limit may be placed on the time for the check processing operation, and therefore a minimum throughput assured. It is preferred that the scanner subsystem be the throughput limiting element, and that a data processing system be employed which assures that the scanner is operating at peak speed. The processing subsystem therefore should be selected in accordance with the scanning speed of the image scanner.

When check styles are uniquely coded, the first step in the identification process is to determine the identity of the code, and look up the code in a database 64. The background can now be tagged with the codebook code from the database 70. If there is a match to the database, a second test may be performed as a background task or as a delayed task. This may be delayed while the necessary information becomes available to the processing subsystem. This second test is to now look up the pattern, represented in the database, based on the code and compare the entire scanned check with the image in the database 72. This is done to ensure that the check that was scanned is not fraudulent in any way, or that the code is not corrupted. This will also allow the printing company to add minor variations to the background pattern that can generally only be seen or deciphered in the scanned image, thereby providing a system for fraud detection and prevention which cooperates with the check processing system. If no codebook entry is found in the database, the operator may be notified 66 that this is a non-standard check, and processed as an exception. As stated above, if the check is nonstandard, yet nevertheless appears genuine according to fraud prevention criteria, then it may be compressed using a standard compression algorithm, as described above. Further, an indication is made which will allow this new check to be included in an image template database update, and to allow consistent coding of this new style.

While this check image matching operation is being processed, the foreground image, which includes the printed information on the check and the added, variable information which is generally handwritten, is processed and compressed. The preprinted information may be subject to the same type of model-based compression as the background image, in particular for constant areas such as borders and designs, while certain portions, such as bank identification, drawer identification, account number and the like may be subject to OCR with identification of the text content and particular font. Finally, the particular information relating to the monetary transfer embodied by the check must also be captured, compressed and preferably analyzed for completeness, inconsistencies, possible indicia of fraud and information content. Handwritten information may be compressed, for example, by modeling the handwriting as a B-spline and storing the control points, which will generally require fewer bits for storage than the raw data. Of course, other compression methods are known in the art.

A preferred processing system includes a parallel or multi-processor system, which may serve as a coprocessor for a standard-type personal computer. The processing system preferably has its own mass storage interface, independent of a mass storage interface of any host processor system. The preferred interface to a mass storage device is a SCSI or SCSI-2 controller, although other types are acceptable. The controller or operating system preferably executes predictive seeks and has a large cache. Further, a slow CD-ROM may be shadowed onto a fast magnetic hard drive.

The foreground processing, many aspects of which may be performed in parallel, proceeds as follows. The processing system performs an image processing operation which separates the foreground from the background image. The foreground image is further decomposed into primitives, such as lines, borders, line graphics, printed text and handwritten text. Each such foreground graphic feature, as it is identified, may be subtracted from the remaining image content 80. Alternatively, a constellation of foreground features that commonly appear together, e.g. postprinted features, may be represented by a code, and thus be represented in highly compressed fashion, proceeding in analogous fashion to the background coding operation. Thus, the system can determine the border 28 that surrounds the check and subtract it off of the scanned image. The foreground processing system can also determine or recognize the bank that issued the check 40 and provide a code for that information. The bank identifying information may then be separated from the remaining foreground image; however it is preferred that the actual image indicating the bank identity be fully characterized in the compressed image. Another process can determine the name and other personal information of the payee 26, i.e. address and telephone number, if available and store this postprinted information as text, font and formatting information (page description information). The image of this data is then separated from the foreground image.

Since it is preferred that the check scanning device be allowed to operate at peak speed, and finite delays in information access and processing occur after the entire check is scanned, the system will generally operate with a processing latency wherein a result is not produced until some time after the scanning has occurred, and likely after a subsequent check has been scanned. In such an instance, it is preferred that the processing system globally optimize the processing based on the availability of data, which may result in out-of-order processing of information. For example, if a first check does not include a zebra code and a second check does, it is likely that the processing of the second check, which requires less processing, will be completed before the first check, which requires only simple processing, even if this delays the processing of the first check slightly. Thus, once scanned, image data records will then be queued up for further processing when the necessary data becomes available to the processor. Checks that have a unique identifying code may be run first, before checks which require more extensive processing, as they can then be compressed much quicker than the ones without any code. In one embodiment according to the present invention, the processing system is not a dedicated image processor, but rather a standard type personal computer or workstation. In this case, the pattern matching delays may be very long, with in-process check images stored on magnetic disk. In such a case, zebra coded checks will likely be processed in real time, while those which must be matched without the assistance of precoding will be delayed, and processed as necessary information or processing resources become available. This may create a substantial backlog of unprocessed images, but this does not cause a problem in a low production environment, where cost effectiveness is more important than high productivity.

If there is no identifying or zebra code on the image to unequivocally identify the background image, an image analysis is done on the check image in order to gain as much information about the check as possible or as necessary. This will minimize the number of times the database needs to be accessed, and the number of database records which need be retrieved, in order to maintain the throughput of the system. The background, or a portion thereof, is analyzed to determine if there is a repeatable pattern 76. If the pattern segment repeats, the segment is classified as a background pattern for this check image 78, at least for the area analyzed or for a portion of the image. As stated above, this intermediate result may be used in an image compression system to define the background by specifying the pattern and its spatially repeated characteristics. The image pattern, however, continues to be processed, as a unique identification of the identity of the check form will produce superior compression results. The identification of a background pattern is used in the image matching system to select a subset of images with a corresponding background pattern.

The image is preferably analyzed for the existence of a number of characteristics, the union of which will define a relatively small number of possible matches in the database.

The database images with corresponding repeatable pattern segments in the background, a primary key for searching, are preferably banded together on the storage medium, which is preferably a CD-ROM or CD-ROM with a fast magnetic hard disk shadow, for efficient accessing. If a second primary key is applied, a second storage subsystem with bands corresponding to the second characteristic is preferably employed. A second key may be, e.g., color, lithographic technique, paper quality or type, etc. The pattern segments are compared to those in the subset of the database for a match. The comparison is preferably done via a rule-based expert system to determine if any conflicts exist (such as extraneous or missing data). Otherwise, the matching is done using a pattern recognition algorithm known in the art. The rule-based system will typically follow the production system model consisting of a set of rules and a database of facts. This can be done with the use of the multi-processor and distributive processing hardware. If there are no conflicts, i.e. the background image matches one of the patterns in the database, the background of the image can be replaced with the code of the pattern from the database codebook 110. If the match is not exact to one in the database, but is within certain prescribed tolerances ($\lambda$) 112, the background can still be replaced with the code from the database codebook 114, but the error or deviance from the exact match is preferably compressed and included in the composite compressed image 116. Once the background image has been matched, the process to filter out the background from the image can be batch processed with checks of the same background either in turn or in parallel.

Because of the relatively slow access and data transfer rates of a CD-ROM, the preferred distribution media for the image database, the read head should be predictively positioned near the data to be retrieved, so that the distance of head movement between accesses is minimized to the extent possible. Further, the number of accesses and the amount of data that needs to be transferred is preferably minimized.

The pattern recognition algorithms, for extracting a background pattern from the check, preferably use a tuned filter (e.g. a spatial image processing filter which is selective for a pattern or class of patterns), for the similar characteristics of the background such as image and colors 102. A subset of the database is defined to minimize the number of accesses to the database 104 and the database is searched accordingly 106.

A rule based system analyzes the image for conflicts in the pattern extraction system, and attempts to resolve them. If resolved, the new pattern is then analyzed to determine if it is a repeating pattern. A repeating pattern will define a subset of images in the database. If the background does not contain a repeating pattern, then it is analyzed for the presence of other characteristics, which may be found on checks which do not have repeating patterns. This may require analysis of the entire check, or the characteristic may be extracted from a portion of the check.

The match processing system may also determine whether there is a partial match. If there is a partial match to more than one image 118, a composite description is created 120 describing how the check is a composite of the multiple stored images and what (if any) are the differences 122. This method of compression will only be employed if the resultant compressed image is smaller than a file created using other methods. If there is not a complete match, i.e. not all of the conflicts can be resolved, the background will be compressed and an error analysis will be appended describing what are the unresolved conflicts.

Thus, the present system provides a variable size compressed image corresponding to the check image, with the size of the image varying from a simple series of codes which defines the check, including an optimally compressed image of the handwritten and post-printed information using a model-based compression approach, to a full image compression for an undecipherable check 124. It is preferred that any check which is of particularly poor quality be manually processed, as it is likely to require manual analysis in any case, and a highly compressed image may tend to lose important data, especially in a poor quality original. Thus, the ultimate exception handling sequence includes operator intervention.

If a pattern is identified, it is then compared to a stored set of libraries of backgrounds to determine if the background is of a standard type, e.g. a type by which entries in the database are indexed. The libraries will consist of raw check images, and may also include characterization data relating to those images. If it is desired to reduce the size of the image database, then these images themselves may be compressed by a model-based compression algorithm which defines an image with respect to simpler graphic primitives. Thus, although preferred, it is not necessary to store entire backgrounds of the standard checks since the background is normally of a repetitive nature. A copy of the database preferably is tailored to fit on a single CD-ROM or other integral storage unit. Because of banding requirements, if space permits, an image of a check may appear in multiple positions in the database; however the identifying data should remain the same for the image regardless of which copy is recognized as a match.

Compressed storage of the image template or model data of the database is preferred because it reduces the penalty of the slow data transfer rate of a CD-ROM, and allows quicker access of related image data. Compressed storage also increases effective storage capacity of the CD-ROM.

It is only necessary to maintain in the library enough information to recognize the repetitive nature of the background. The background information stored in the database may be in a standard compressed format. If the format is not lossless, then an error analysis mechanism is provided to ensure a match. When particular information is retrieved, it can be decompressed for the pattern recognition and analysis. On the other hand, depending on the type of compression employed for data in the database and the requirements of the pattern recognition system, the image data may be analyzed without decompression or with only partial decompression. In such a case, it is preferred that the compression format be compatible with the pattern recognition and analysis format.

The libraries in the database are preferably correlated into a codebook of standard check background images. These libraries are based on certain groupings or bands of information. These bands will consist of similar colors or types of patterns. In order to maintain the efficiency of the system, when it is determined that the background pattern is within a certain band on the CD-ROM with particular characteristics, the contents of that band may be predictively transferred to a cache for prospective analysis. Preferably, the rate of downloading of data will meet or exceed the processing speed of the matching process; however, if the data access is slower, then the system may perform other tasks until the necessary data becomes available. Other libraries in the database include, for example, image features of the checks, account numbers or other identifying information with known backgrounds, account numbers or other identifying information with unknown backgrounds, signatures and other handwritten information or specialized backgrounds, e.g. computer screen, stock certificates or corporate bond certificates. These can be linked together in a dependent fashion depending upon the priority of the list of features or information.

In the preferred embodiment, according to the present invention, the matching process should preferably have a throughput at least 30 checks per minute, i.e. take no more than two (2) seconds for any one scanned check to be scanned before the next scanning operation commences, although a long latency for completion of processing is permissible. Further, this processing rate, while preferably sustainable indefinitely, should be sustainable for at least one hour. If, within the time constraints, no match to the database is found, the pattern matching process will be terminated and the entire image will be compressed using standard compression techniques.

Such standard techniques include compression by defining a set of Fourier coefficients or wavelet coefficients to describe the image with a reduction in raw data. In addition, new images may be added to the library, as an addendum in a temporary storage medium, such as RAM, local magnetic hard drive, EEPROM or flash memory. These added data entries preferably include the same indexing as the database itself, although any addenda may be processed separately and by different criteria, i.e. since these are stored on a more accessible media, the matching need not be optimized for the presumed slow access of the main data store. If these unrecognized checks meet the criteria established, they are included in an update of the distributed database. If the system is on-line, the new image may also be sent to a clearinghouse or the other banking sites so that the other libraries may be updated on a real-time basis. These may also be updated at a later time.

Regarding the detection of the background image of an unknown inputted document image, one may elect to compute some feature analysis during or immediately following scanning to accelerate the task of determining the background from the codebook database. As an example, a color scanner may be designed to set certain mask bits indicating a scanned document has some particular color, e.g. red. The bits set during scanning may be used to direct further processing of unknown input images, e.g., the red color bit is set during scanning, but the yellow color bit is not set. The document image can then be further processed with other images containing red in bulk fashion, but completely separate and independent from those document images containing yellow.

The foregoing implies that a hierarchical codebook organization is possible. Several independent and separate codebook databases can be organized whereby members of the same codebook share perhaps some common features. Continuing the example, there can be election to have a "yellow" codebook, i.e. background templates that contain some yellow are "clustered" together in one logical codebook, and thus only unknown input images with a yellow bit set need be tested against this codebook. Concurrently, there may also be a "red" codebook to process unknown input images against with red, but not yellow.

The approach is know in the art and many different features can be used for this organization. The intent is to divide "feature space" into separate domains of the database that can be inspected in parallel. The computational benefit is the reduction of the size of a codebook that is searched, and the parallel processing of multiple unknown input images.

By way of example, if there are 100 backgrounds, 50 of which have yellow but no red, and 50 of which have red but no yellow. Then, given an unknown input image of a document, known to have yellow, the document would be compared to at most 50 backgrounds, rather than at most 100 backgrounds. Therefore, the computational complexity of the search has been reduced in the worst case by halving the size of the codebook database searched. In parallel, a search of the red codebook for an unknown image, will cause the same reduction in computational complexity. And since both the red and yellow documents may be processed in parallel by two separate parallel processors, obvious reduction time is multiplied.

Now, however, designing a means of forming hierarchical codebooks by further dividing the yellow codebook into multiple, smaller, disjoint or small overlapping codebooks, e.g. yellow and blue but no purple codebook, or yellow and purple but no blue codebook is possible.

Further, the hierarchically organized codebooks define a logical decision tree or indexing structure for searching a database of templates. This means that the processing of an unknown input image on a single processor can be accomplished with hierarchical codebook organizations simply by using the organization as a search tree to find relevant templates for comparison to the input image. Thus, the organization serves as a single database indexing structure, or a decision tree, or a means of parallel processing multiple images against separate collections of templates.

Producing several codebooks or possibly hierarchical codebook organizations, requires a means of dividing the set of background image templates into subsets that contain related backgrounds, according to some criteria over feature space, while the subsets are disjoint, i.e. two members of two distinct subsets have distinct feature values.

Such organizations of data and databases are commonly achieved by various clustering algorithms. Clustering algorithms are generally iterative optimization programs that in piecemeal fashion compute averages over some feature domain of individual objects, i.e. document image background template, in such a way as to minimize global optimization criteria, e.g., the minimum squared-error criterion. Those skilled in the art will understand that such programs approximate maximum likelihood estimates over the means.

It is sought to have easily detectable features that can cluster backgrounds into related subsets of hierarchically organized codebooks. It should be further understood that any number of possible features can be used, for example statistical measures, spatial domain features, frequency domain features, relationships between objects or other features.

One can further define a centroid template of each distinguished subset that may be used to detect early in the process which codebook to search given some unknown image. The unknown image is first compared to a set of centroid templates that embody perhaps a number of feature values, and the closest matching centroid indicates that the background for the image is to be found in the codebook that it represents. The centroid may be computed by a clustering program that computes the means of the feature values of the members of the codebook formed by clustering. Such centroids represent mean feature values of some sort that are chosen or computed by some clustering program to accurately distinguish the unknown background information.

The clustering program itself may be viewed as an offline process performed to initialize a set of codebooks or hierarchically organized codebooks. As such, it may be executed in parallel for efficiency in speed either to initialize codebooks, or to update existing codebooks, or for entire reorganization of existing codebooks.

The manner in which clustering programs can be executed in parallel is similar to the manner in which unknown images are compared to or searched in a codebook of templates. Here, it is iteratively compared to a distinct template, t, to all previously processed templates presently residing in some codebook, $C_i$, where i is greater than 1. Some distance function, d, is computed between t and every codebook by computing the distance of t from some member of $C_i$ or a centroid representing $C_i$. That codebook $C_j$ found to have some minimum distance is selected for membership by t, i.e., t is assigned to $C_j$, and $C_j$3 s average feature values are updated to reflect the incorporation of t in its subset.

Further processing of the selected subset is possible, for example recomputation of some global mean or statistic for all present members of the selected codebook. Such recomputation statistics, like the mean, can be used to represent the centroid template of the subset used for further processing of additional template backgrounds. The comparison of t to existing codebooks can be performed in parallel. The computation of statistics for a distinct codebook, like the mean values of some feature, can likewise be performed in parallel.

As part of the parallel processing, the foreground information can also been compressed. As noted above, the bank information and the border can be truncated and replaced with codes. Any other preprinted information that is supplied by the printer, such as "Pay to the Order of" 42, "Memo" 38, "Signature" 36, "Dollars" 34, "Date" 30, check number 32, digitalized code 56 or any other information that is printed on the check as part of the standard printing information, is either part of, for example the zebra code or 2-dimensional coding and can be truncated, or can be replaced with standard text characters with font and formatting information for standard compression 38.

The scanned data is now compressed by deleting the background pattern and the preprinted information, leaving only the personalized information from the check along with the code for the background pattern and the preprinted, foreground information. As with the data recognition of the background information, the personalized portions will work the same with the use of the pattern directed inference system and the rule based algorithms.

In one embodiment according to the present invention, the payor's signature on the check 50 is verified for authenticity by comparing it with a database of signatures 84 including a representation of the signature of the drawer. If the signature does not match a corresponding signature in the database 86, the bank operator needs to be informed for manual verification and the possibility of a possible fraudulent check 88.

In the preferred system, the written amount 54 will be checked for against the numerical value written 48 to ensure that they are the same and to ensure that there is a sufficiency of funds in the payor's account. The date 46 is determined from the written information 90 and is then verified to safeguard against a stale check (normally one more than three months to a year old, depending upon the type of check) or a check that has been post-dated, i.e. where the date on the check is later than the actual day of deposit 92. The bank operator is preferably informed of any problems with the dating of the check 94. Endorsements on the back side of the check are also preferably examined for accuracy, fraud and authentication by comparing it against the stored signatures in the database.

If the foreground data is handwritten, it can be further reduced by employing the model-based algorithm of B-spline 98. This will compress the written characters to control points. In order to save space on the database medium, the preferred method will only have the B-spline control points stored for comparison of the payor's signature and of the endorser's signature. If the data is typed or printed on the check, such as for the check amount, or the courtesy figure, the processor need only determine the font and formatting characteristics of the information 100. The image portions of this information can now also be eliminated, further compressing the data to be transmitted and stored.

In order for the banking system to maintain security and transmission verification, encoding and encryption preferably employed on the compressed data before transmitting to the other sites or to the clearinghouse. A protocol is established between the connecting facilities. The compressed check image may be encoded, e.g. given a transaction identifier, based on the number of transactions done that day or the number of checks that were scanned, or some standard form of encryption coding. The transmitting facility must request authorization from the receiving facility to send the compressed data.

The compressed data is now transmitted to the central storage device via a telecommunications system, e.g. interact system. The receiving facility would either be the payor bank or a clearinghouse. The compressed image is preferably archived at least one of these institutions. If it is transmitted to the clearinghouse, it must then be transmitted again to the payor bank. After the data is transmitted, the transmitting facility needs to know that the transmission was valid and that the data was received correctly by the receiving facility. Once this is accomplished, the transmitting facility will either erase the compressed data from its storage or alter it indicating that the image has been transmitted to another facility. This will keep the system integrity secure and will ensure that the check is processed only once. If there is to be multiple transmissions of the data, e.g. between the payee bank and the clearinghouse and then between the clearinghouse and the payor bank, there is preferably a system including multiple levels of encryption. In this instance, the payee bank will put on two levels of encoding. The first one is to be decoded by the clearinghouse and the second one is to be decoded by the payor bank. The clearinghouse is in this sense acting as a controller of the data and does not need to actually know what the data is. All the clearinghouse needs to know is where the data is to be sent. This information can be built into the outside encryption method. If there are not the proper levels of encryption, or the codes are not correct, the transmission is deemed not valid and a retry is requested. If the encryption is still not correct, the receiving facility will be so notified as to a possible fraudulent transmission.

After completing the correct protocol with the transmitting facility and establishing a valid transmission to the payor bank, the originator's account will be settled and a statement will be sent to the originator. Otherwise an error flag will be sent to the computer operator indicating that there is a problem with the check.

Instead of electronically transmitting the compressed image of the check, another method is to download the image onto magnetic media and transport the media via conventional physical transfer mechanisms. This may be done in lieu of setting up a secured and/or trusted series of network communication and still obtaining some of the benefits of compressing the data. Bulk transport of the mass amounts of physical paper checks is no longer necessary and is replaced with it all on magnetic media. Such physical transport may also be employed in case of failure of the telecommunications network.

Another embodiment according to the present invention includes a scanner that produces multiple images at different resolutions and gradient scales. This way there is a greater probability of being able to match the background information with the information stored in the database. This will aid the matching of the models in the database to the scanned image. As discussed above, an ultra-high resolution scanning may be required to image and verify certain anti-fraud lithography on the check.

As discussed above, images of text may be subjected to optical character recognition (OCR) for decomposition into text, font and formatting information. The present invention also allows the use of other presently available or future options, and is thus compatible with OCR data conversion (even if done manually) or any other type of commercial scanning process. Thus, after the check image is scanned, the data is available for any type of analysis, including the present model-based pattern recognition and extraction techniques. This compatibility with standard OCR systems and the like is especially helpful for post-printed, typed information such as the alpha-numeric amount, courtesy amount or even the signature (if stamped). This information may be captured from the various subsystems and can then all be reduced to codes in the codebook. The decompression and regeneration of the checks would then be of a cleaner version then the original.

Likewise, the image data remaining after elimination of the background image information may be further reduced by going through standard compression algorithms, as for example JPEG in order to eliminate any white space or other redundancies. See Wallace, G. K., "The JPEG Still Picture Compression Standard", *Communications of the ACM*, 34(4):30–44 (1991). Thus, the present invention may be applied as an open system, which is compatible and works in tandem with existing related systems. Other image compression methods are also known, including ABIC, U4, and run length encoding.

Along with doing parallel operations for the background and various foreground data checks via a multi-processor system, the searching for the background code and/or the scanned image pattern can be broken down and searched for over a network of processors, which may be loosely or tightly coupled. See Tanenbaum, *Modern Operating*

Systems, pp. 3, 362–394 for a discussion of distributed process operating systems. In this case, it is preferred that each processor maintain locally in fast memory at least a related sub-set of the total database. The scanned image is broadcast over a secured network to a number of processor sites and each site can search its portion of the total database in a fraction of the time it would take to access the entire database as a whole. The different databases would have different criteria to search for, e.g. different compressed images, different scales of scanned images or different search algorithms. Once a match is found, a broadcast message goes out to the other processors in the network to cease the search and the matching code is sent to the original site that initiated the search. Otherwise, a "not found" indication is sent across the network, after the slowest processor completes its necessary tasks. This method greatly reduces search time but there is a cost in order to communicate over a secured network between the separate processor sites. If these sites are remote, then an encryption security method is preferably employed, similar to those described above with respect to transmission to the clearinghouse or other banks.

Another embodiment according to the present invention includes a system in which the image to be matched does not come from a paper scanning device. Instead, the image is generated directly in the computer such as from a computer graphics package. This can be done from a drawing that was originally created or altered on a computer. Of course, the most efficient compression of this data is identifying information on how it was created and the customized information. If such information is not available, then the pixel image is processed similarly to the model-based image pattern recognition and compression system described above.

In general, when a code for the background information is found in the database and the code then replaces the actual background in the subtraction and compression method, the check can be reconstructed with different scales, resolutions and sizes, depending upon the requirements of the requestor of the copy. Further, when the compression system is broadly viewed as being for optimal compression of any of a number of types of image data, the ability to reproduce the entire image or portions thereof with varying resolution is useful. For example, if the scanner operates at 600 dpi, with portions scanned at 2400 dpi, it is preferred that a copy be produced at 300 dpi, a standard laser printer resolution, unless this additional information is necessary. Likewise, if the image is scanned at 600 dpi, while a 2400 dpi printer is being employed, the matched background may be printed at the full 2400 dpi resolution, derived from an exemplar check, rather than the 600 dpi as scanned. If handwritten information is stored as B-spline control points, this data may also be scaled in printer resolution manner and output at the maximum resolution available. Further, if desired, signature information may be output at maximum resolution, while other information output at lower resolution. The present system also allows reproduction of only a portion of the image, e.g. the foreground, with elimination of the background. This may be employed to provide a customer with a monthly statement where no irregularities are suspected. The present scalable output system also allows "cameo" representations to be presented.

The present variable resolution reproduction allows for a high resolution computer output microfilm (COM) to be produced from the compressed record, if such a backup is desired. This system may actually allow a higher resolution image to be stored than by standard microfilming or microfiching techniques, and simplifies the elaborate production necessary in order to directly microfilm checks.

The present example relates to a further adaptation of the data compression and storage system for reducing fraud and improving security in banking practice. In this instance, a bank security camera may capture an image or series of images of a person cashing a check. Information relating to the person is separated from the background, and the image compressed. The compressed image may then be appended to the check record, to allow identification of the person cashing the check should this be an issue. Alternatively, data relating to a fingerprint of the person cashing the check may be captured, compressed or analyzed, and appended to the image data file. This concept could thus be used for storing and transmitting identification information for law enforcement networks.

A video analysis system may also be used, in conjunction with a model based analyzer to efficiently generate a detailed representation of an individual from a series of video frames or from a scanned photograph. This may be done in conjunction with a type of identification card with a person's picture on it. Rotational algorithms may need to be implemented in order to normalize an image to a frontal orientation. The image may also be checked in real time against a database of images of depositors. This verification may be by automated methods or by presenting the stored and live image to an operator to verify. Therefore, the person cashing the check or document can be immediately verified as the person to whom the document is made out to.

An efficient method of identifying the bank customer who cashes the check is, if the person's image is present in the database, to append a code to the financial transaction record including the check information as well as an index code to an image of the person in the bank's database. Information relating to the check's casher only needs to be stored long enough for the check to be cleared through the system and for the originator to be notified of the check's disposition. Once that takes place and there is no question as to the casher of the check, the compressed image can be removed and only the original information on the check needs to be stored for the required length of time as per banking procedures. If the person's video image is not in the data base, then an entire compressed image (with the background of the bank removed) may be sent, or retained by the bank, with the check for verification of the payee until the check is cleared.

As an alternative to video camera images or a scanned photograph image, a fingerprint of the payee can be taken when the payee goes to the payee bank to cash or deposit the check. The fingerprint image is to be scanned with a special scanner, which may include a laser or other mechanism known in the art. The resulting fingerprint image is compressed using known techniques, and matched to a fingerprint identification database. If there is no match, then the fingerprint stored in compressed form by known methods and the compressed image is sent with the compressed check image. As with the video image, the fingerprint image need not remain with the compressed check image for the required length of time as per banking standards, but only long enough for the payee to be verified as the intended payee. This is an added measure of security against fraud.

A further embodiment of the image pattern recognition system according to the present invention is to implement the system using optical computing techniques. An optical image correlator may be used to identify the check background and produce a transformed residual image, which may then be further compressed. The optical image correlator may be an electro-optic device operating on scanned image data, which is projected by laser beam from a modulated light shutter onto a holographic crystal onto which a plurality of latent background images have been stored. When a background pattern matches one of the stored patterns, the resulting image will differ, in a manner indicative of which image is recognized, from an unrecognized image. Further, the error signal after the optical correlator represents the correlator error, which is the foreground signal and any noise.

A full optical system is also possible, in which the check is illuminated by laser, and the reflected image is then subjected to an optical correlator which includes latent images of a plurality of check background images. The laser light passes through the crystal, and produces a pattern, which is detected by an electronic image sensor, e.g. CCD or CID array, which represents a background identification (if any) and a residual which represents the foreground and noise.

In a further embodiment, a check is imaged by a 300 dpi line imaging scanner, with a scan width of about 4.5 inches, and which acquires a color image in a single pass. This scanner is arranged to obtain an image of both sides of the check, by sequentially imaging both sides with a single imaging scanner, or providing two opposed imaging scanners. The image is obtained with a 6 bit scale for each color, thereby providing 18 bit color. The scanner has a motorized feed, which advances the check through the scanner head. A feeder may be provided, although checks may be fed manually.

The output of the scanner is fed into a data port of a computer system. The computer system includes a central processor, which is, e.g., an Intel 486 class processor (DX2-33, DX-50, DX4-75, DX4-100, etc.) with primary cache, with a 256 k Byte secondary cache, and 8–16M Bytes RAM. The processor system is interfaced to a hard disk drive having 250–1000 MBytes of storage. The processor system is also interfaced to a double speed CD-ROM device. The scanner and CD-ROM are preferably interfaced to the processor system by way of a SCSI interface. The hard drive may be either a SCSI or IDE device. The processor system also has a floppy disk drive and a modem.

In operation, a check is scanned by the scanner. The information is transferred to the processor system through the SCSI interface. The entire image is buffered in RAM. The check image is first analyzed for the appearance of an identifying code, such as a zebra code. If this is not identified, the image is then analyzed for information identifying the manufacturer or style of the check. If this identifying information is not located, a portion of the check background is then extracted and analyzed. Certain characteristics are then identified in this portion. A database, resident on the CD-ROM, which is transferred to the hard drive and buffered in RAM, is searched to identify backgrounds contained on the CD-ROM which are possible matches for the unidentified check. These possible matches are ranked according to ease of access on the CD-ROM and likelihood of match, and are sequentially retrieved from the CD-ROM and compared with the unidentified image, until a match is found. If no match is found, the unidentified image is compressed according to known methods.

If a match is found, the matched background is subtracted from the foreground image. The foreground image is compressed by identification and characterization of printed information, and B-spline decomposition of handwritten information. The various compressed information is concatenated into a single data file, and encrypted. The encrypted file is stored on the hard drive for later transmission by physical (floppy disk) or electronic transmission.

In a yet another embodiment, a check is imaged by a 600 dpi two-sided line imaging scanner, with a scan width of about 4.5 inches, and which acquires a color image in a single pass. The image is obtained with a 8 bit scale for each color, thereby providing 24 bit color. The scanner has an automated feed, which sequentially advances the checks through the scanner head.

The scanner is interfaced by way of a SCSI interface to a computer system. The computer system includes a central processor, which is, e.g., an Intel Pentium class processor with a 256 kByte secondary cache, and 16 MBytes RAM. The processor system is interfaced to a hard disk drive having 1–2 GBytes of storage. The processor system is also interfaced to a quad or higher speed CD-ROM device. The hard drive and CD-ROM are preferably interfaced to the processor system by way of a SCSI interface. The processor system also includes a digital signal processor or dedicated image processor as a coprocessor. The processor system also has a floppy disk drive and a modem.

In operation, both sides of a check are scanned by the scanner. The information is transferred to the processor system through the SCSI interface. The entire image is buffered in RAM. The check image is first analyzed for the appearance of an identifying code, such as a zebra code. If this is not identified, the image is then analyzed for information identifying the manufacturer or style of the check. If this identifying information is not located, a portion of the check background is then extracted and analyzed. Certain characteristics are then identified in this portion. A database, previously transferred from the CD-ROM to the hard drive is buffered in RAM and is searched to identify known backgrounds which are possible matches for the unidentified check. These possible matches are ranked according to ease of access on the CD-ROM and likelihood of match, and are sequentially retrieved from the hard drive and compared with the unidentified image, until a match is found in the DSP of image processing coprocessor. If no match is found, the unidentified image is compressed by the coprocessor according to known methods.

If a match is found, the matched background is filtered from the foreground image. The foreground image is compressed by identification and characterization of printed information, and B-spline decomposition of handwritten information by the coprocessor. The various compressed information is transferred to the primary processor and concatenated into a single data file, and encrypted. The encrypted file is stored on the hard drive for later transmission by secure electronic transmission.

In a still another embodiment, a check initially scanned by a spatial frequency detector, which detects a maximum level of spatial detail of the front and back of a check to be scanned. The check is then imaged by a 600 dpi two-sided imaging scanner, with a scan width of about 4.5 inches, and which acquires a color image in a single pass. The image is obtained with a 8 bit scale for each color, thereby providing 24 bit color. Areas which are identified by the spatial frequency detector as having a spatial frequency of greater than about 200 per inch are then scanned by a second scanning system at a resolution of about 2400 dpi. The scanner has an automated feed, which sequentially advances the checks through the scanner head. The scanner is included in a system which can store images of a large number, i.e.

greater than about 100, check images, including the high resolution image.

The scanner is interfaced by way of a SCSI interface or a high speed link, e.g., FDDI, ATM, 100base VG, etc., to a computer system. The computer system includes a closely linked parallel processing network, each node including a central processor, which is, e.g., an Intel Pentium class processor with a 256 kByte secondary cache, and 16 MBytes RAM, and a CD-ROM drive.

Database Management

THE MERGE/PURGE PROBLEM

The present task relates to the merging of two or more databases containing financial instrument image data, or tables within databases, with potentially many hundreds of millions of records. For the sake of discussion, let us assume that each record of the database represents information about employees and thus contains, e.g., social security numbers, a single name field, and an address field as well as other significant information. Numerous errors in the contents of the records are possible, and frequently encountered. For example, names may be routinely misspelled, parts missing, salutations at times included, as well as nicknames in the same field. In addition, employees that are the subject of the listing may move, or marry thus increasing the variability of their associated records. Table 1 displays records with such errors that may commonly be found in mailing lists for junk mail, for example.

There are two fundamental problems with performing a merge/purge procedure. First, the size of the data sets involved is so large that only a small portion of the database can reside in the processor main memory (RAM) at any point in time. Thus, the database resides on external store (e.g., magnetic media) and any algorithm employed must be efficient, requiring as few passes over the full data set as possible. Quadratic time algorithms are not feasible in this environment. Second, the incoming new data has a statistical likelihood of corruption, from either purposeful or accidental events, and thus the identification of matching data requires complex tests. Simple structural matching operations (i.e., one field "equals" another) are not possible in all cases. Furthermore, the inference that two data items represent the same domain entity may depend upon considerable knowledge of the task domain. This knowledge depends on the particular application and is available to those skilled in the art working with the database.

TABLE 1

| SSN | Name (First, Initial, Last) | Address |
| --- | --- | --- |
| 334600443 | Lisa Boardman | 144 Wars St. |
| 334600443 | Lisa Brown | 144 Ward St. |
| 525520001 | Ramon Bonilla | 38 Ward St. |
| 525250001 | Raymond Bonilla | 38 Ward St. |
| 0 | Diana D. Ambrosion | 40 Brik Church Av. |
| 0 | Diana A. Dambrosion | 40 Brick Church Av. |
| 0 | Colette Johnen | 600 113th St. apt. 5a5 |
| 0 | John Colette | 600 113th St. ap. 585 |
| 850982319 | Ivette A Keegan | 23 Florida Av. |
| 950982319 | Yvette A Kegan | 23 Florida St. |

EXAMPLE 1

EXAMPLE OF MATCHING RECORDS DETECTED BY AN EQUATIONAL THEORY RULE BASE

THE SORTED NEIGHBORHOOD METHOD

Two approaches are available to obtain efficient execution of any solution: utilize parallel processing, and partition the data to reduce the combinatorics of matching large data sets. Hence, a means of effectively partitioning the data set in such a way as to restrict attention to as small a set of candidates for matching as possible is required. Consequently, the candidate sets may be processed in parallel. Furthermore, if the candidate sets can be restricted to a small subset of the data, quadratic time algorithms applied to each candidate set may indeed be feasible, leading to perhaps better functional performance of the merge task.

One possible method for bringing matching records close together is sorting the records. After the sort, the comparison of records is then restricted to a small neighborhood within the sorted list. This technique is referred herein as the sorted neighborhood method. The effectiveness of this approach is based on the quality of the chosen keys used in the sort. Poorly chosen keys will result in a poor quality merge, i.e., data that should be merged will be spread out far apart after the sort and hence will not be discovered. Keys should be chosen so that the attributes with the most discriminatory power should be the principal field inspected during the sort. This means that similar and matching records should have nearly equal key values. However, since it is assumed that the data contains corruptions, and keys are extracted directly from the data, then the keys could also be corrupted. Thus, it is expected that a substantial number of matching records will not be caught. In fact, experimental results, demonstrate this to be the case.

Given a group of two or more database tables, they can first be concatenated into one sequential list of records and then processed according to the sorted neighborhood method. The sorted neighborhood method for solving the merge/purge problem can be summarized in three phases:

Create Keys: Compute a key for each record in the list by extracting relevant fields or portions of fields.

Sort Data: Sort the records in the data list using the key of step 1.

Merge: Move a fixed size window through the sequential list of records limiting the comparisons for matching records to those records in the window. If the size of the window is w records, then every new record entering the window is compared with the previous records to find "matching" records. The first record in the window slides out of the window.

When this procedure is executed serially, the create keys phase is an O(N) operation, the sorting phase is O(N log N), and the merging phase is O(wN), where w is the number of records in the database. Thus, the total time complexity of this method is O(N log N) if w<[log N], O(wN) otherwise. However, the constants in the equations differ greatly. It could be relatively expensive (i.e. require substantial computational resources to solve a problem having a high computational complexity) to extract relevant key values from a record during the create key phase. Sorting requires a few machine instructions to compare the keys. The merge phase requires the matching of a large number of rules to compare two records, and thus has the largest constant factor. Note, however, the dominant cost will be the number of passes over the data set during sorting (possibly as many as log N passes), an I/O bounded computation.

CLUSTERING THE DATA FIRST

Since sorting the data is the dominant cost of the sorted-neighborhood method, it is desirable to reduce the number of records that are sorted. An easy solution is to first partition the data into clusters using a key extracted from the data. The sorted-neighborhood method is then applied to each individual cluster. This approach is called the clustering method.

Given a group of two or more databases, these can first be concatenated into one sequential list of records. The clustering method can be summarized as a two phase process:

Cluster Data: Scan the records in sequence and for each record extract an n-attribute key and map it into an n-dimensional cluster space. For instance, the first three letters of the last name could be mapped into a 3D cluster space.

Sorted-Neighborhood Method: The sorted-neighborhood method is applied independently on each cluster. It is not necessary, however, to recompute a key (step 1 of the sorted neighborhood method). The key extracted above for sorting may be employed.

When this procedure is executed serially, the cluster data phase is an O(N) operation, and assuming the data is partitioned into C equal sized clusters, the sorted-neighborhood phase is O(N log (N/C)).

Clustering data as described above raises the issue of how well partitioned the data is after clustering. If the data from which the n-attribute key is extracted is distributed uniformly over its domain, then it can be expected that all clusters will have approximately the same number of records in them. But real-world data is very unlikely to be uniformly distributed and thus, it must be expected that it will be necessary to compute very large clusters and some empty clusters.

Sometimes the distribution of some fields in the data is known, or can be computed as the data is inserted into the database. For instance, a database may contain a field for names. Lists of person names are available from which, e.g., the distribution of the first three letters of every name can be computed, thus providing a cluster space of bins (26 letters plus the space). If such a list is unavailable, the name field of the database tables may be randomly sampled to have an approximation of the distribution of the first three letters. In any case, it is easy to create a frequency distribution histogram for several fields in the databases. All of this information can be gathered off-line before applying the clustering method.

Assuming the data is divided into C clusters using a key extracted from a particular field. Given a frequency distribution histogram with B bins for that field ($C \leq B$), those B bins (each bin represents a particular range of the field domain) may be divided into C subranges. Let $b_i$ be the normalized frequency for the $i^{th}$ bin of the histogram:

$$\sum_{i=1}^{B} b_i = 1$$

Then for each of the C subranges the expected sum of the frequencies over the subrange is close to 1/C (e.g., if bins s to e, $1 \leq s \leq e \leq B$ are assigned to one cluster then it is expected:

$$\sum_{i=s}^{e} b_i \simeq \frac{1}{C}$$

Each subrange will become one of the clusters and, given a record, the key is extracted from the selected field, and map the key into the corresponding subrange of the histogram. The complexity of this mapping is, at worst, log B.

EQUATIONAL THEORY

The comparison of records, during the merge phase, to determine their equivalence is a complex inferential process that considers much more information in the compared records than the keys used for sorting. For example, suppose two person names are spelled nearly (but not) identically, and have the exact same address. It might be inferred they are the same person. On the other hand, supposing two records have exactly the same social security numbers, but the names and addresses are completely different, it could either be assumed that the records represent the same person who changed his name and moved, or the records represent different persons, and the social security number field is incorrect for one of them. Without any further information, the latter might perhaps be assumed more likely. The more information there is in the records, the better inferences can be made. For example, Michael Smith and Michele Smith could have the same address, and their names are "reasonably close". If gender information is available, it could be inferred that Michael and Michele are married or siblings.

What is needed to specify for these inferences is an equational theory that dictates the logic of domain equivalence, not simply value or string equivalence. There are of course numerous methods of specifying the axioms of the theory, including assembler code (presumably for speed). Users of a general purpose merge/purge facility will likely benefit from higher level formalisms and languages permitting ease of experimentation and modification. For these reasons, it is preferred to employ a natural approach to specifying an equational theory and making it practical, using a declarative rule language. Rule languages have been effectively used in a wide range of applications requiring inference over large data sets. Much research has been conducted to provide efficient means for their evaluation, and this technology can be exploited here for purposes of solving merge/purge. This technology is known to those skilled in the art.

As an example, a simplified rule in English that exemplifies one axiom of the equational theory relevant to merge/purge applied to the idealized employee database is shown below:

Given two records, r1 and r2.
IF the last name of r1 equals the last name of r2,
  AND the first names differ slightly,
  AND the address of r1 equals the address of r2
THEN
  r1 is equivalent to r2.

The implementation of "differ slightly" specified here in English is based upon the computation of a distance function applied to the first name fields of two records, and the comparison of its results to a threshold. The selection of a distance function and a proper threshold is also a knowledge intensive activity that demands experimental evaluation. An improperly chosen threshold will lead to either an increase in the number of falsely matched records or to a decrease in the number of matching records that should be merged. A number of alternative distance functions were implemented and tested including distances based upon edit distance, phonetic distance and "typewriter" distance. The results presented below are based upon edit distance computation since the outcome of the program did not vary much among the different distance functions.

For the purpose of experimental study, an OPS5 rule program consisting of 26 rules for this particular domain of employee records was used over relatively small databases of records. See C. L. Forgy, "OPS 5 user's manual", *Technical Report CMU-CS*-81-135, Carnegie Mellon University (July 1981). Once the performance of the rules is deemed satisfactory, distance functions, and thresholds, the program was recoded with rules written directly in C to obtain speed-up over the OPS5 implementation. Table 1 demonstrates a number of actual records this program correctly deems equivalent. Although compilers for rule languages exist, see D. P. Miranker, B. Lofaso, G. Farmer, A. Chandra, and D. Brant. "On a TREAT-based production system compiler", *Proc. 10th Int'l Conf. on Expert Systems*, pp 617–630, (1990), there is still a significant gap in performance forcing the inevitable conversion to C. However, OPS5 provided an especially useful prototyping facility to define an equational theory conveniently.

USING THE TRANSITIVE CLOSURE OVER THE RESULTS OF INDEPENDENT RUNS

Once an equational theory is specified for matching database records and converted to a program, the matching program is applied to a small subset of data, e.g., those records presently in the window of the sorted list. The program output thus depends upon whether matching records appear in a window. Consequently, the effectiveness of the sorted neighborhood method highly depends on the key selected to sort the records. A key is defined to be a sequence of a subset of attributes, or substrings within the attributes, chosen from the record. (For example, the last name of the employee record may be chosen as a key, followed by the first non blank character of the first name field followed by the first six digits of the social security field, and so form.)

In general, no single key will be sufficient to catch all matching records. Keys give implicit priorities to those fields of the records occurring at the beginning of the sequence of attributes over others. If the error in a record occurs in the particular field or portion of the field that is the most important part of the key, there is little chance this record will end up close to a matching record after sorting. For instance, if an employee has two records in the database, one with social security number 193456782 and another with social security number 913456782 (the first two numbers were transposed), and if the social security number is used as the principal field of the key, then it is very unlikely both records will fall under the same window. Thus, the records will not be merged. The number of matching records missed by one run of the sorted neighborhood method can be comparatively large.

To increase the number of similar records merged, two options can be explored. The first is simply widening the scanning window size by increasing w. Clearly this increases the complexity, and, as discussed in the next section, does not increase dramatically the number of similar records merged (unless of course the window spans the entire database, which as noted corresponds to an infeasible $N^2$ operation). The alternative strategy is implemented to execute several independent runs of the sorted neighborhood method, each time using a different key and a relatively small window. For instance, in one run, the social security number might be used as the principal part of the key while in another run the last name of the employee might be used as the principal part of the key. Each independent run will produce a set of pairs of records which can be merged. The transitive closure is then applied to those pairs of records. The results will be a union of all pairs discovered by all independent runs, with no duplicates, plus all those pairs that can be inferred by transitivity.

Figure 13:
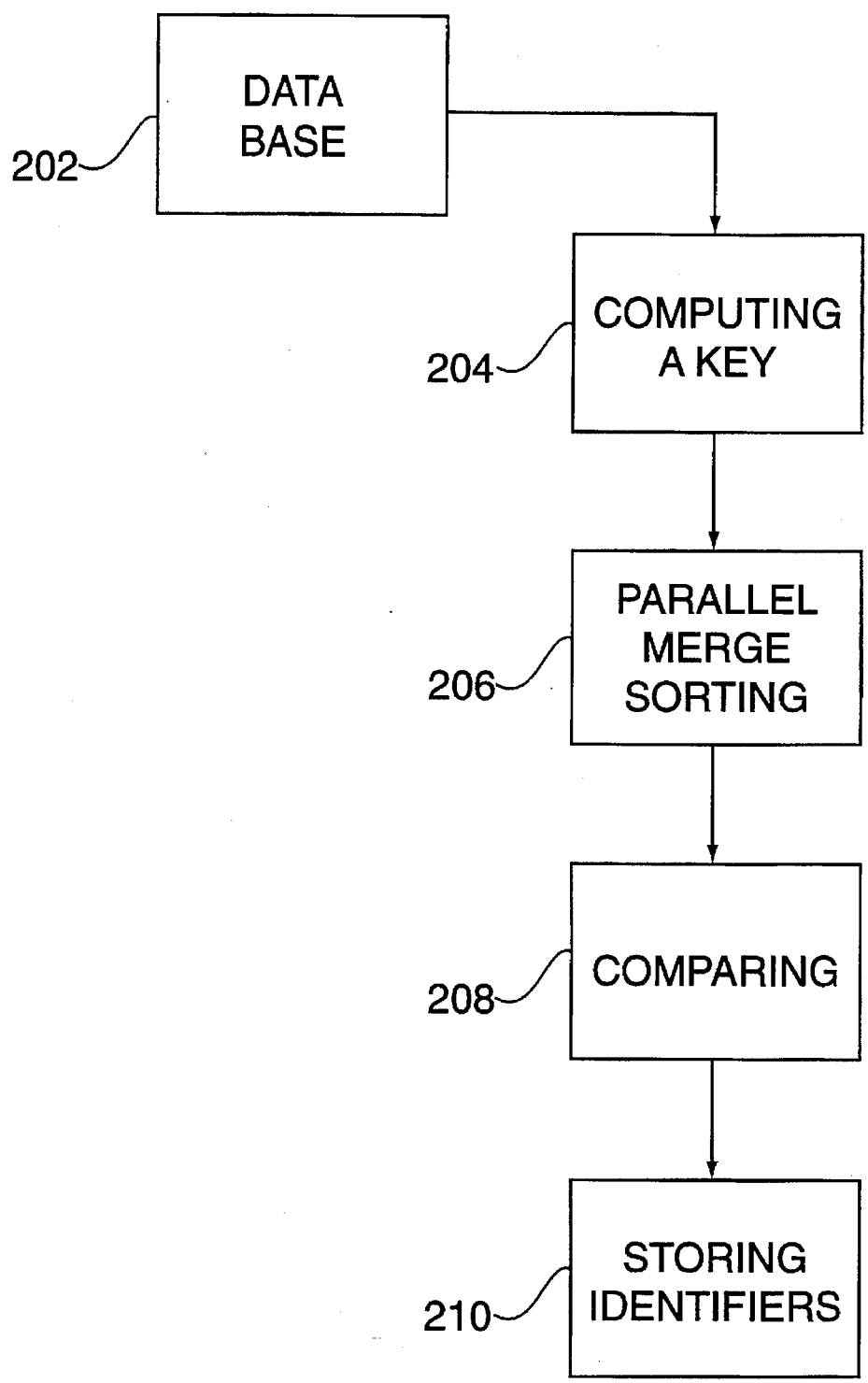
FIG. 13 is a flow chart representation of the steps involved in sorting, comparing and storing identifiers, in accordance with a preferred embodiment of the invention.
Figure 14:
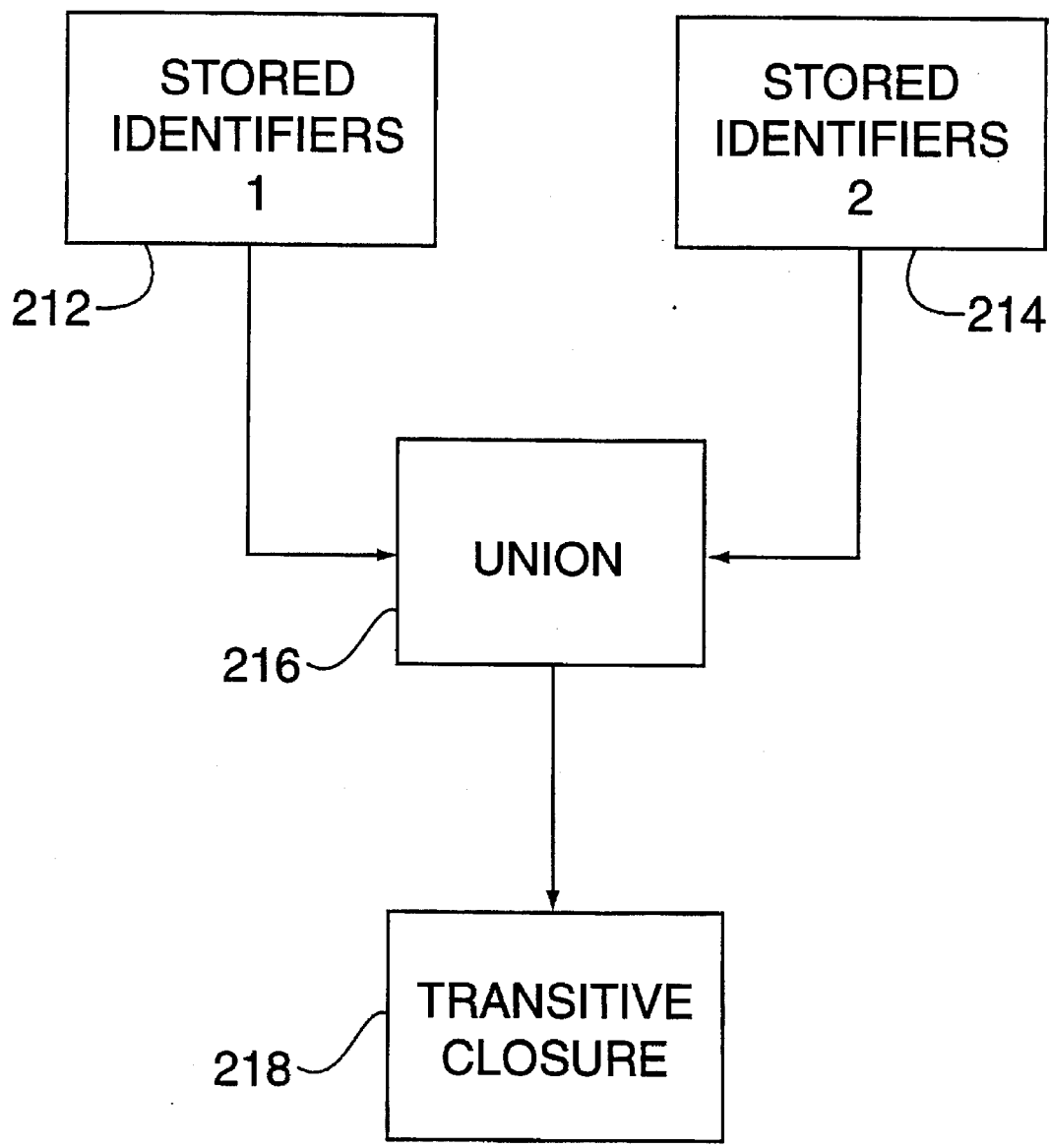
FIG. 14 is a flow chart representation of the steps involved in creating a union of stored identifiers, and subjecting the union to transitive closure.

More particularly, as shown in FIG. 13, database 202 is subjected to step 204 wherein a key is computed for each record in database 202 by extracting at least a portion of a first field. Next, the records in database 202 are subjected to the technique of parallel merge sorting at step 6 (where multiple processors are used), or merge sorting (where a single processor is used). A predetermined number of sequential records sorted according to the key are compared to each other in step 208 to determine if one or more of the records match. Identifiers are created for any matching records and are stored in step 210.

Where the process shown in FIG. 13 is repeated for multiple databases or clusters of records in one database, stored identifiers 1 and 2 are created as shown in boxes 12 and 14 of FIG. 14. A union of these stored identifiers are created by step 216, and subjected to transitive closure as shown in step 218 of FIG. 14.

In the following, several independent runs of the sorted neighborhood method are combined with the transitive closure of the results, which drastically improves the results of one run of the sorted neighborhood method. A drawback of this combination is the need of several runs of the sorted neighborhood method. However, each independent run requires only a small search window. No individual run produced comparable results with large windows. Thus, the complexity of the merge phase for the sum total of these independent runs is smaller than the complexity of one run with a large window while its functional performance was far superior.

EXPERIMENTAL RESULTS

GENERATING THE DATABASES

All databases used to test the sorted neighborhood method and the clustering method were generated automatically by a database generator program. This database generator allows the selection among a large number of parameters including, the size of the database, the percentage of duplicate records in the database, and the amount of error to be introduced in the duplicated records. The principal benefit of the generator is to perform controlled studies and to establish the functional performance of the solution method. Each record generated consists of the following fields, some of which can be empty: social security number, first name, initial, last name, address, apartment, city, state, and zip code. The names are chosen randomly from a list of 63000 real names. The cities, states, and zip codes (all from the U.S.A.) come from publicly available lists.

The noise introduced in the duplicate records can go from small typographical changes, to complete change of last names and change of addresses. When setting the parameters for the kind of typographical errors, known frequencies from studies in spelling correction algorithms were used. See K. Kukich, "Techniques for automatically correcting words in text", *ACM Computing Surveys*, 24(4):377–439 (1992). For this study, the generator selected from 10% to 50% of the generated records for duplication with noise.

PRE-PROCESSING THE GENERATED DATABASE

Pre-processing the records in the database prior to the merge/purge operation might increase the chance of finding two duplicate records. For example, names like Joseph and Giuseppe match in only three characters, but are the same name in two different languages, English and Italian. A nicknames database or name equivalence database could be used to assign a common name to records containing identified nicknames.

Since misspellings are introduced by the database generator, the results can probably be improved by running a spelling correction program over some fields before submitting the database to the sorting neighborhood method. Spelling correction algorithms have received a large amount of attention for decades. See Kukich, Supra. Most of the spelling correction algorithms considered use a corpus of correctly spelled words from which the correct spelling is selected. A corpus for the names of the cities in the U.S.A. (18670 different names) is available and can be used to attempt correcting the spelling of the city field. The algorithm described by Bickel in M. A. Bickel. "Automatic correction to misspelled names: a fourth-generation language approach", *Communications of the ACM*, 30(3):224–228 (1987) was selected for its simplicity and speed. The use of spell corrector over the city field improved the percent of correctly found duplicated records by 1.5%–2.0%. A greater proportion of the effort in matching resides in the equational theory rule base.

RUNNING THE SORTED NEIGHBORHOOD METHOD

The purpose of this first experiment was to see how many duplicate records the sorted neighborhood method could find. Three independent runs of the sorted neighborhood method were run over each database, and a different key was used during the sorting phase of each independent run. On the first run the last name was the principal field of the key (i.e., the last name was the first attribute in the key). On the second run, the first name was the principal field of the key. Finally, in the last run, the street address was the principal field of the key. The selection of the keys was purely arbitrary, and could have used the social-security number instead of, say, the street address. The data generator is assumed to be controlled, such that all fields are noisy and therefore it should not matter which fields are selected.

Figure 7A:
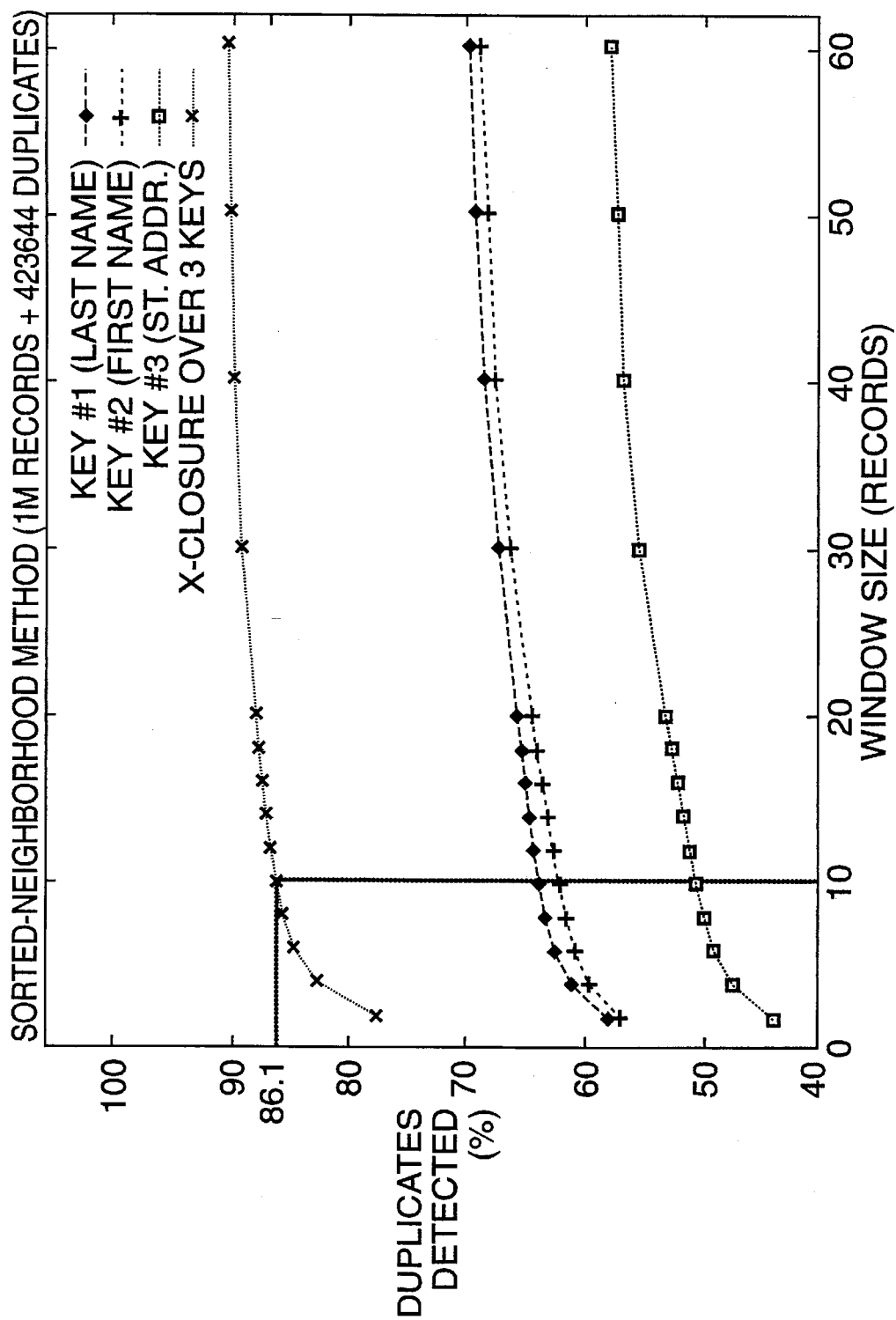
FIGS. 7A and 7B are two graphs of the percent correctly duplicated pairs for a 1,000,000 records database.

FIG. 7A shows the effect of varying the window size from 2 to 50 records in a database with 1,000,000 records and with an additional 1423644 duplicate records with varying noise. A record may be duplicated more than once. Each independent run found between 50 and 70% of the duplicated pairs. Increasing the window size does not help much and taking in consideration that the time complexity of the procedure goes up as the window size increases, it is obviously fruitless to use a large window size.

The line marked as X-closure over 3 keys in FIG. 7A shows the results when the program computes the transitive closure over the pairs found by the four independent runs. The percent of duplicates found goes up to almost 90%. A manual inspection of those records not found as equivalent revealed that most of them are pairs that would be hard for even a human to identify without further information (e.g., both records do not have a social security number, the names are the same or very close, the street addresses are the same but in different states).

Figure 8:
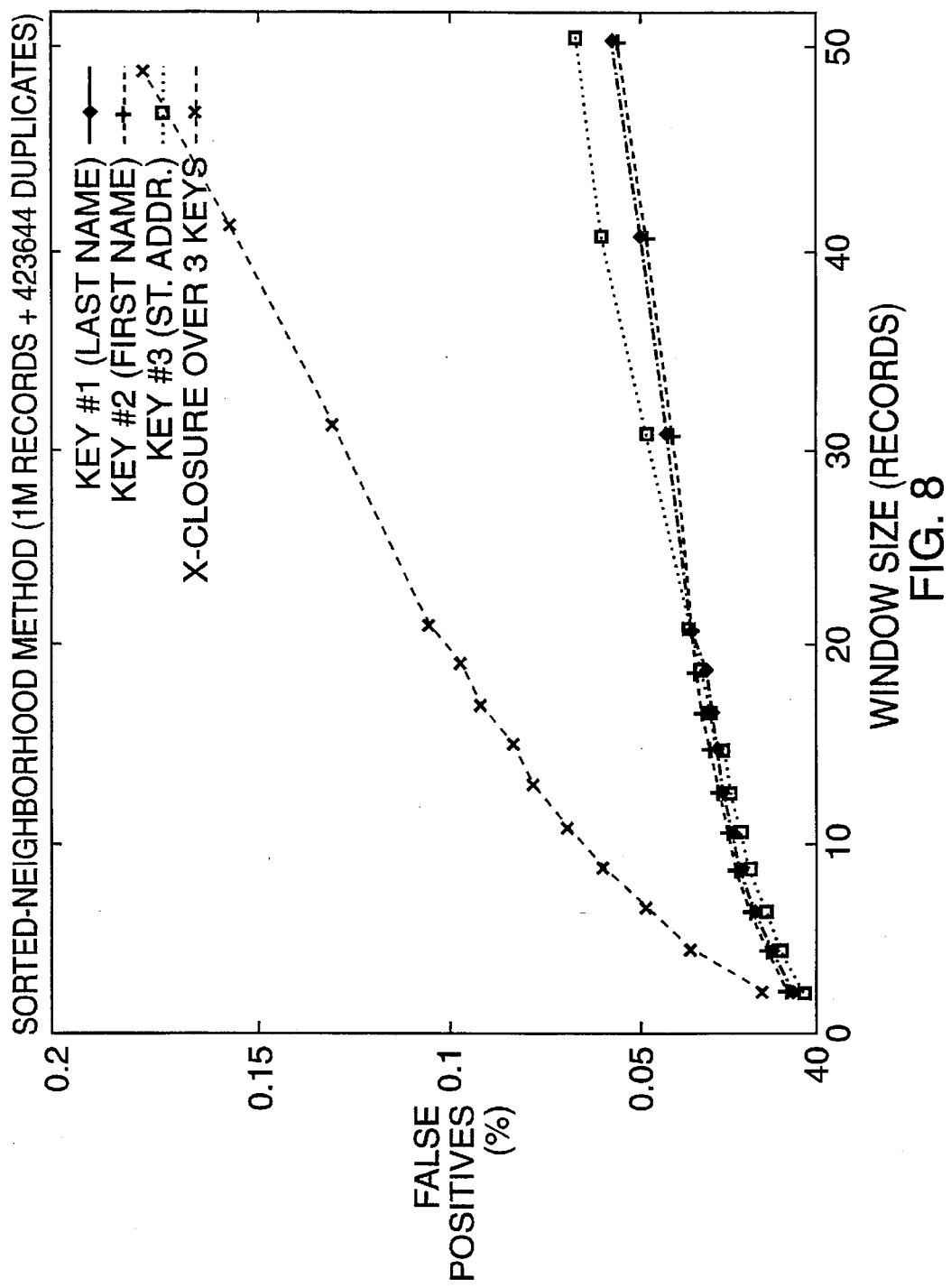
FIG. 8 is a graph of the percent incorrectly detected duplicated pairs for a 1,000,000 records database.

However, the equational theory is not completely accurate. It can mark two records as similar when they are not the same real-world entity (false-positives). FIG. 8 shows the percent of those records incorrectly marked as duplicates as a function of the window size. The percent of false positives is almost insignificant for each independent run and grows slowly as the window size increases. The percent of false positives after the transitive closure is used is also very small, but grows faster than each individual run alone. This suggests that the transitive-closure may not be effective if the window size is very large.

The number of independent runs needed to obtain good results with the computation of the transitive closure depends on how corrupt the data is and the keys selected. The more corrupted the data, more runs might be needed to capture the matching records. Although not shown in FIG. 7A, the sorted-neighborhood method, conducted with only two independent runs and computing the transitive closure over the results of those two runs, produced a percentage of detected duplicate records of between 70% to 80%. The transitive closure, however, is executed on pairs of record id's, each at most 30 bits in the present example, and in general log N bits, and fast solutions to compute transitive closure exist. See R. Agarawal and H. V. Jagadish, "Multi-processor transitive closure algorithms", *Proc. Int'l Symp. on Databases in Parallel and Distributed Systems*, pp 56–66 (December 1988). From observing real world scenarios, the size of the data set over which the closure is computed is at least one order of magnitude smaller than the matching database of records, and thus does not contribute a large cost. But note there is a heavy price due to the number of sorts of the original large data set.

ANALYSIS

The approach of using multiple sorts followed by the transitive closure is referred to as the multi-pass approach. The natural question posed is when is the multi-pass approach superior to the single sorted neighborhood case? The answer to this question lies in the complexity of the two approaches for a fixed accuracy rate. The accuracy rate, as defined herein is the total percentage of "mergeable" records found.

The complexity of the multi-pass approach is given by the time to create keys, the time to sort r times, wherein the present example r=3 times, and window scanning r times (of window size w) plus the time to compute the transitive closure:

$$T(\text{multi-pass}) = c_1 rN + c_2 rN \log N + c_3 rwN + T(TC)$$

where r is the number of passes, and $T(TC)$ is the time for the transitive closure. The constants depict the costs for comparison only and are related as $c_1 < c_2 \ll c_3 = \alpha c_2$, where $\alpha > 1$. From analyzing the experimental program, the window scanning phase contributes a constant, $c_3$, which is at least $\alpha = 3$ times as large as the comparisons performed in sorting, while the create keys constant, $c_1$, is roughly comparable to the comparisons used in sorting. Thus, for the purposes of the present analysis, it is assumed that $c_1 = c_2$, while $c_3 = \alpha c_2$. Hence, the constants are replaced in terms of the single constant c. The complexity of the closure is directly related to the accuracy rate of each pass and is certainly dependent upon the duplication in the database. However, it is assumed the time to compute the transitive closure on a database that is orders of magnitude smaller than the input database to be less than the time to scan the input database once (i.e. less than linear in N, and contributes a factor of $c_4 N < N$). Thus, $$T(\text{multi-pass}) = crN + crN \log N + \alpha crwN + c_4 N = (c + cr \log N + \alpha crw)N + c_4 N$$

for a window size of w. The complexity of the single pass sorted neighborhood approach is similarly given by:

$$T(\text{single-pass}) = cN + cN \log N + \alpha cWN = (c + c \log N + \alpha cW)N$$

for a window size of W.

For a fixed accuracy rate, the question is then for what value of W for the single pass sorted neighborhood method does the multi-pass approach perform better in time, i.e.

$$(c \quad c\log N \quad \alpha cW) > (cr \quad cr\log N \quad \alpha crw)\frac{c_4 N}{N}$$

or $$W > \frac{r-1}{\alpha}(1+\log N) + rw + \frac{c_4 N}{\alpha cN}$$

In the experiments performed and reported in the following sections, $N=2^{20}$ records, $\alpha$ is approximately 3, c is approximately $8 \times 10^{-5}$, w=10, and $T(TC)=c4N \leq 180$ seconds. Thus, the multi-pass approach dominates the single sort approach when W>45.

Figure 9A:
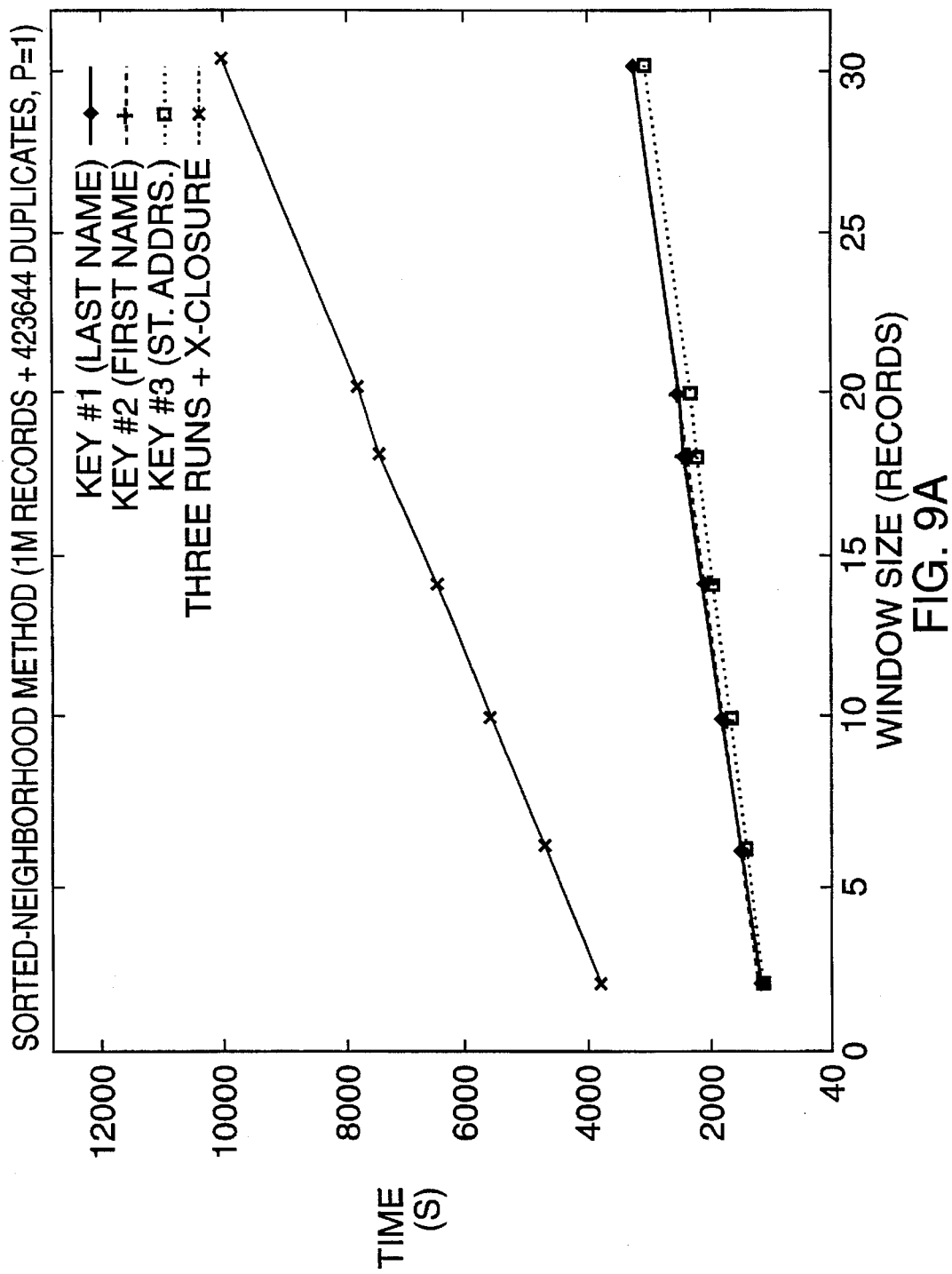
FIGS. 9A and 9B are two graphs of time results for the sorted-neighborhood and clustering methods on a single processor.

FIG. 9A shows the time required to run each independent run of the sorted-neighborhood method on one processor, and the total time required for the multi-pass approach. As shown in FIG. 7A, the multi-pass approach was found to produce an accuracy rate of 86.1% using a window size of 10. The time performance of the single pass run is similar to the time performance of the multi-pass approach with w=10 when W≈56, a little over what was estimated above. But, the performance ratios of all single-pass runs in FIG. 1, at W=50, are from 17% to 28%, well below the 86.1% performance of the multi-pass approach. To study how large the window size W must be for one of the single-pass runs to achieve the same level of performance as the multi-pass approach, the rule based equational theory was replaced with a stub that quickly tells us if two records within the window are actually equal (thus the "ideal" performance is studied). The results, depicted in FIG. 10, show that any single-pass run would need a window size larger than W=50,000 to achieve the same performance level as the multi-pass approach using w=10. The "real" performance lines in FIG. 10 are those of FIG. 7A, which are included to provide a sense of how effective the present rule-based equational theory is when compared with the ideal case. Thus, the multi-pass approach achieves dramatic improvement in time and accuracy over a single-pass approach. Further, the multi-pass approach may also be parallelized, clearly making the multi-pass the dominate method.

EXAMPLE 2

THE CLUSTERING METHOD

Figure 7B:
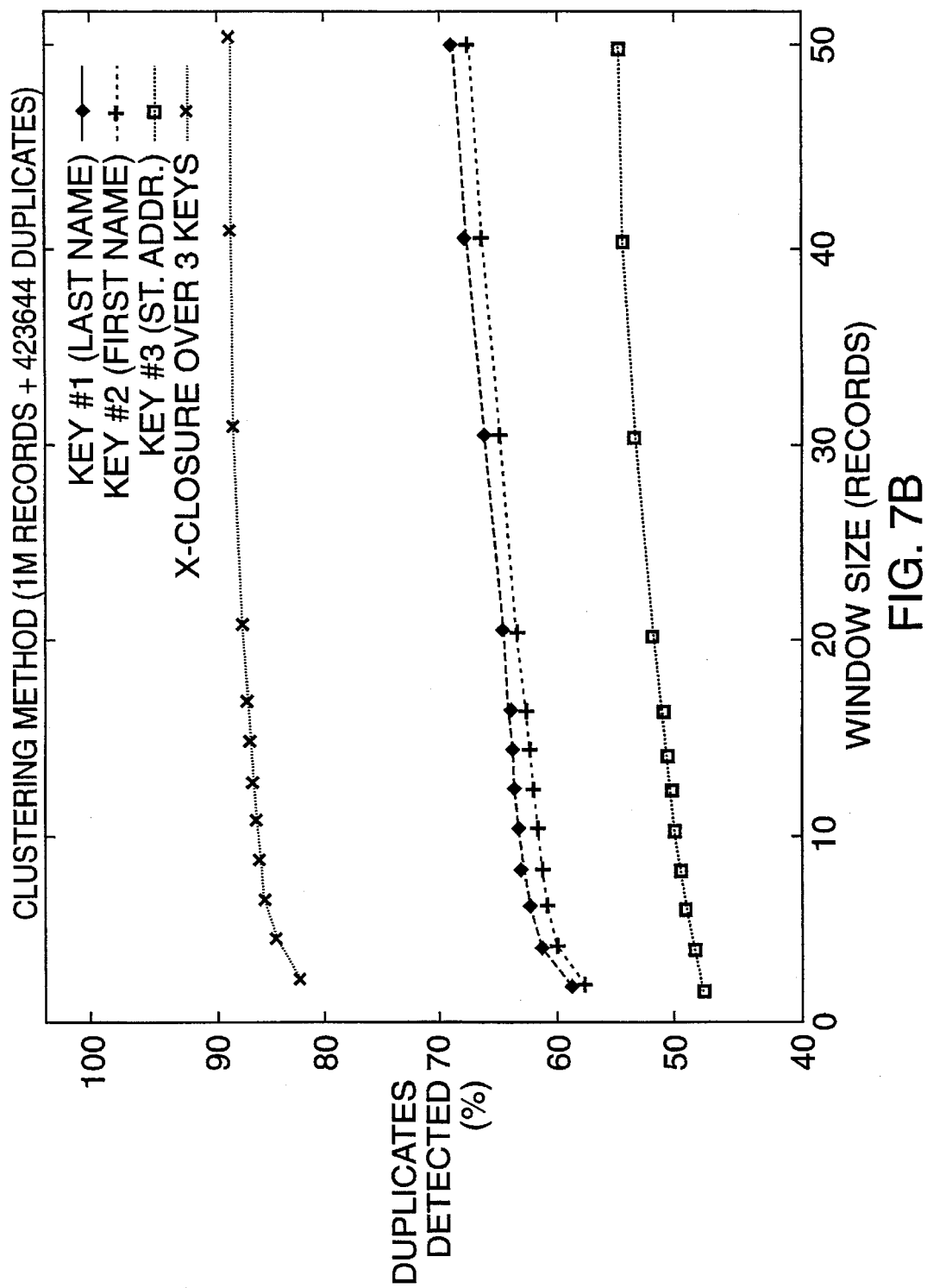
Figure 9B:
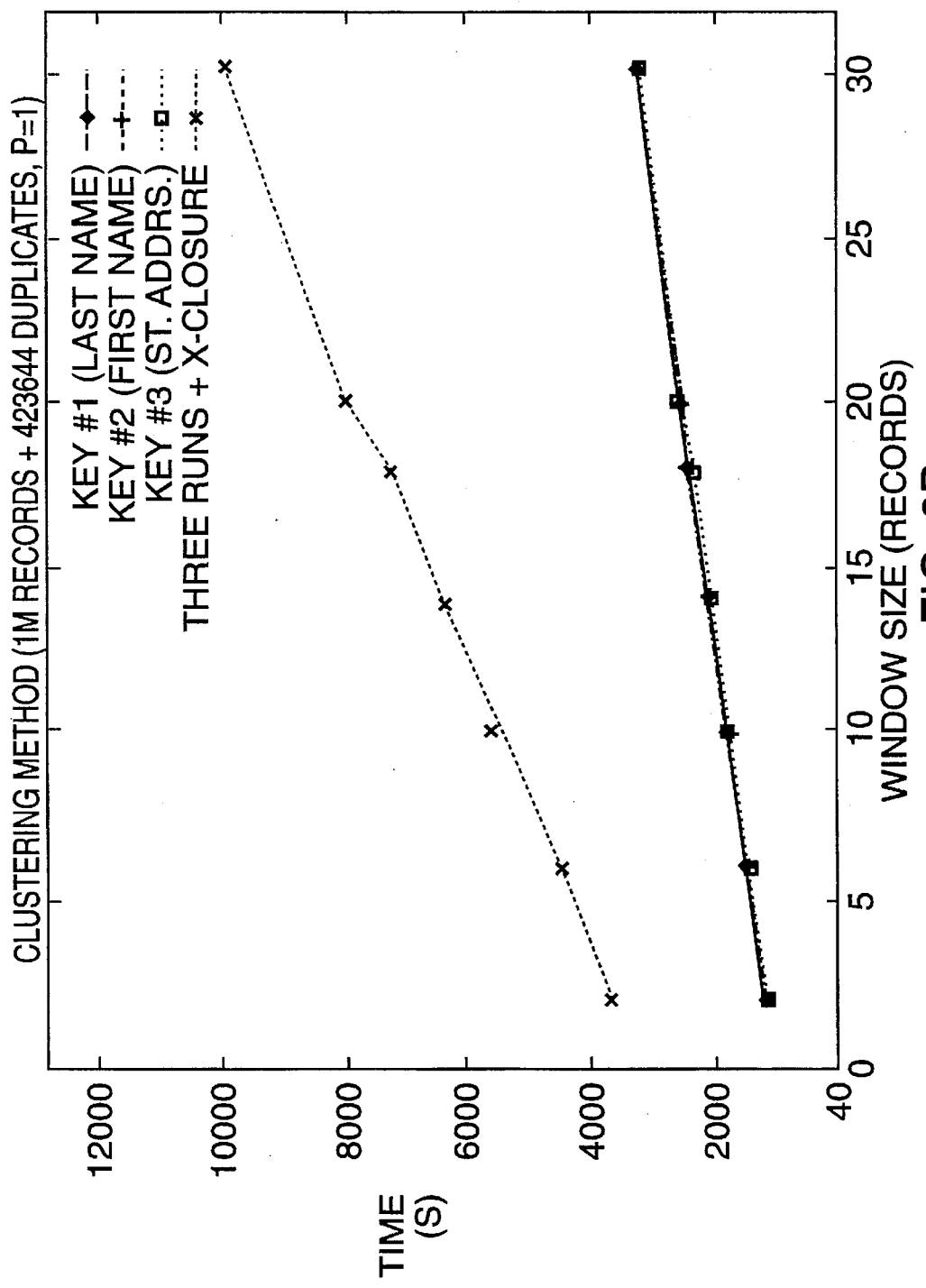

The same experiment was repeated using the clustering method to first partition the data into clusters, using the same three keys used above for the sorted-neighborhood method and ran three independent runs, one for each key. Then the transitive closure over the results of all independent runs was computed. The results are depicted in FIG. 7B. Comparing the performance results in FIG. 9B, it is noted that the performance level is almost the same for both methods. The timing results for these experiments are shown in FIG. 9B.

EXAMPLE 3

PARALLEL IMPLEMENTATION

With the use of a centralized parallel or distributed network computer, a linear speedup over a serial computer is sought to be achieved.

THE SORTED-NEIGHBORHOOD METHOD

The parallel implementation of the sorted-neighborhood method is as follows. Let N be the number of records in the database. The implementation is presumed to have P processors, each processor being able to store M+w records, where w is the size of the merge phase window, and M is a blocking factor. Furthermore, since very large databases are the subject of this example, it is assumed that P<<N and MP<N. First, the input database is sorted in parallel using the well known technique of parallel merge sorting. Then, the sorted database is divided into N/MP blocks. Each of the N/MP blocks is processed in turn as follows. Let $r_i$ represent record i in a block, $0 \leq i < MP-1$. Each processor p receives records $r_{(p-1)M}, \ldots, r_{pM-1}, \ldots, r_{pM+w-2}$, for $1 \leq p \leq P$, (i.e., each processor gets a partition of size M records plus the w−1 records of the next partition of the block). Then matching records can be searched independently at each processor using a window of size w. This process is then repeated with the next block of records. The time for the merge phase process under this scheme is, in theory, O(wN/P).

Each independent run of the sorted-neighborhood method is independent of other independent runs. Therefore, given n times more processors, independent runs may be executed concurrently and at the end compute the transitive closure over the results.

Figure 11A:
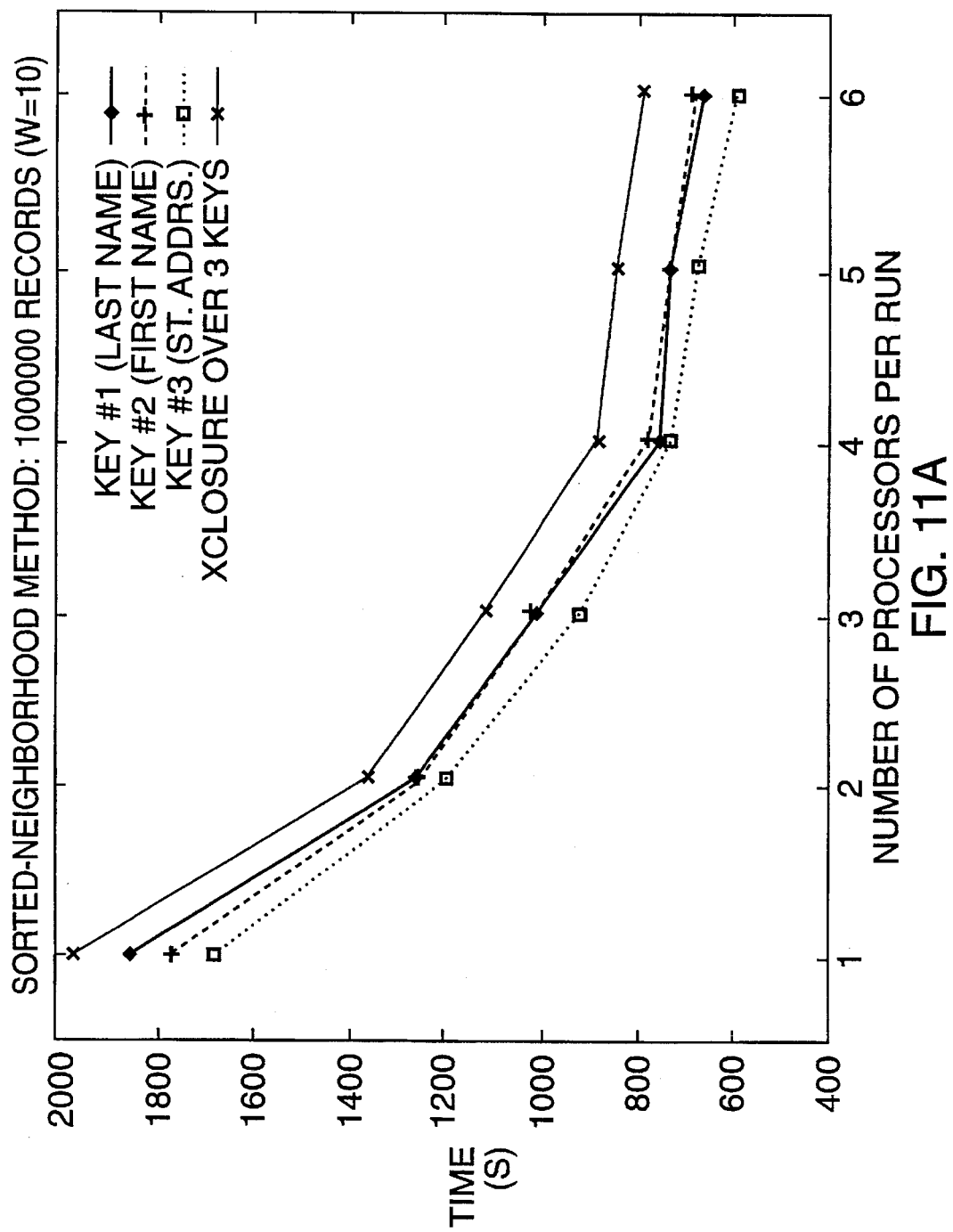
FIGS. 11A and 11B are two graphs of time results for the sorted-neighborhood and clustering methods on a multiprocessor system.

The sorted-neighborhood method was implemented on an HP cluster consisting of eight HP9000 processors interconnected by a FDDI network. FIG. 11A shows the total time taken for each of the three independent runs from FIG. 7 as the number of processors increases. The window size for all these runs was 10 records. FIG. 11A also includes the time it will take the sorted-neighborhood method to execute all three independent runs over three times the number of processor and then the computation of the transitive closure of the results. Using the system described above, enough processors to run all sorted-neighborhood runs concurrently were unavailable, so that the time taken for all of the runs must be estimated from results of each independent run. All independent runs were run serially and the results were stored on disk. The transitive closure was then computed over the results stored on disk and the time measured for this operation. The total time if all runs are executed concurrently is, approximately, the maximum time taken by any independent run plus the time to compute the closure. The speed-ups obtained as the number of processors grows are not exactly linear. The main reason for this is the inherent sequentialities in the process like reading and broadcasting the data to all processes.

EXAMPLE 4

THE CLUSTERING METHOD

The parallel implementation of the clustering method works as follows. Let N be the number of records in the database, P the number of processors and C the number of clusters to be formed per processor. Given a frequency distribution histogram, its range is divided into CP subranges as described above. Each processor is assigned C of those subranges. To cluster the data, a coordinator processor reads the database and sends each record to the appropriate processor. Each processor saves the received records in the proper local cluster. Once the coordinator finishes reading and clustering the data among the processors, all processors sort and apply the window scanning method to their local clusters.

Load balancing of the operation becomes an issue when more than one processor is used and the histogram method does a bad job of partitioning the data. The present system attempts to do an initial static load balancing. The coordinator processor keeps track of how many records it sent to each processor (and cluster) and therefore it knows, at the end of the clustering stage, how balanced the partition is. It then redistributes the clusters among processors using a simple longest processing time first (LPT) strategy. See R. Graham, "Bounds on multiprocessing timing anomalies", *SIAM Journal of Computing*, 17:416–429 (1969). That is, move the largest job in an overloaded processor to the most underloaded processor, and repeat until a "well" balanced load is obtained. Elements of this technique are known. See H. M. Dewan, M. A. Hernandez, J. Hwang, and S. Stolfo, "Predictive dynamic load balancing of parallel and distributed rule and query processing", *Proceedings of the 1994 ACM Sigmod Conference* (1994).

Figure 11B:
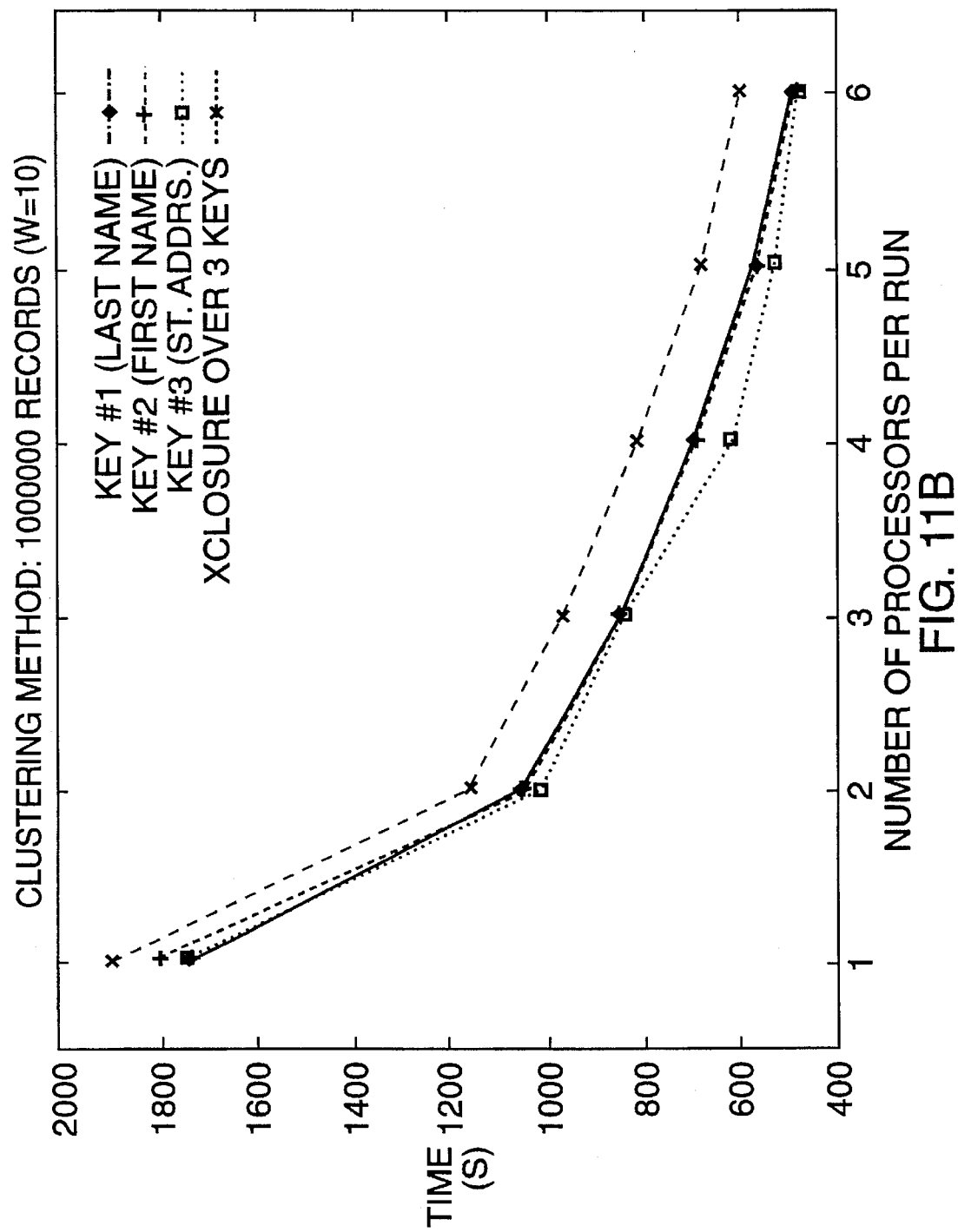

The time results for the clustering method are depicted in FIG. 11B. These results are for the same database used to obtain the timing results for the sorted neighborhood method, a window size of 10 records, and 100 clusters per processor. Comparing the results in FIG. 11B with FIG. 11 A, it is noted that the clustering method is, as expected, faster than the sorted-neighborhood method.

EXAMPLE 5

SCALING UP

Figure 12B:
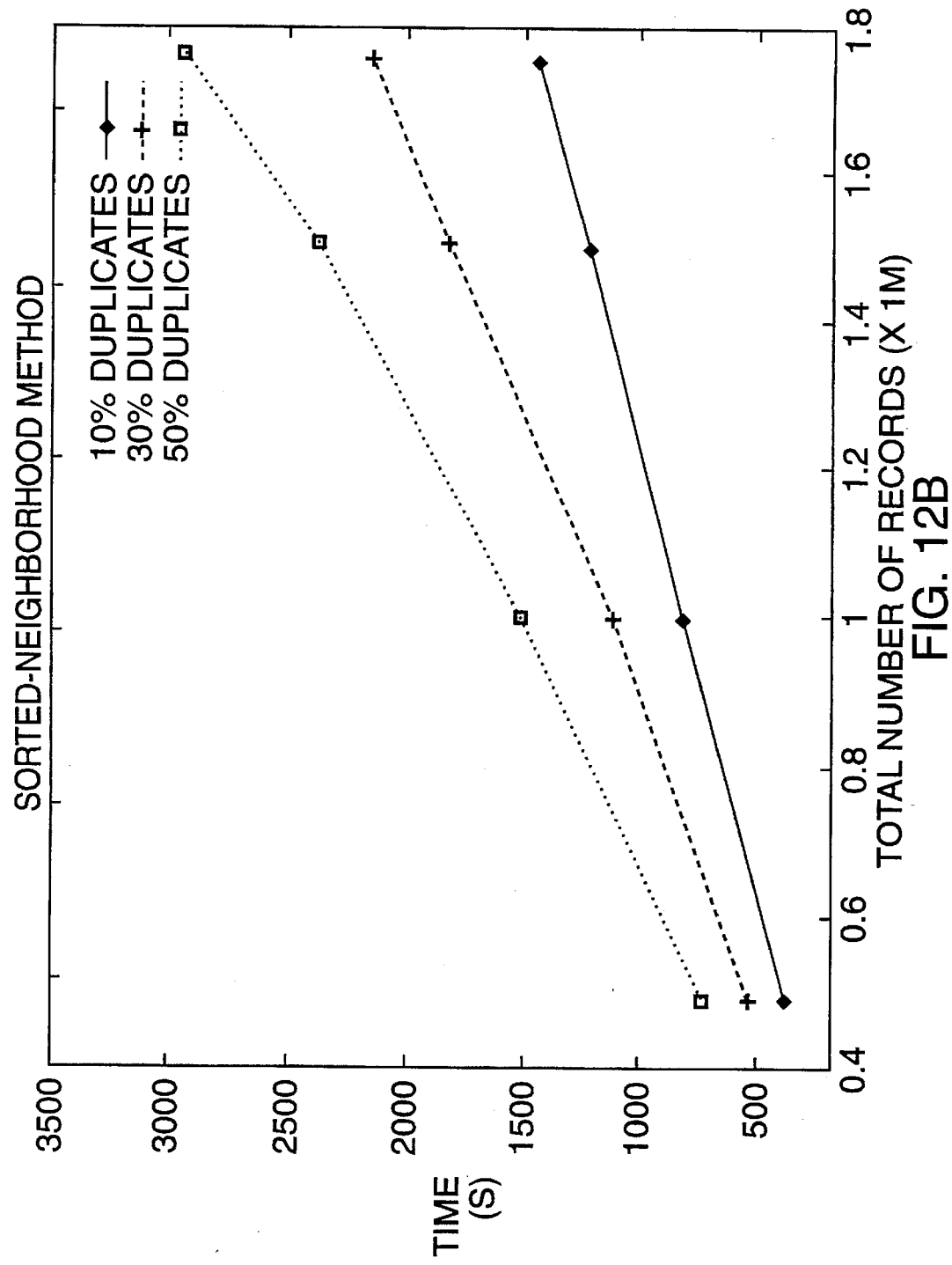

Finally, the sorted-neighborhood method and clustering method are demonstrated herein to scale well as the size of the database increases. The present example is limited, by virtue of limitations in disk space in the experimental system, to databases up to about 3,000,000 records. Of course, larger systems could be implemented without this limitation by providing more disk space. Again, three independent runs were run using the sorted-neighborhood method (and the clustering method), each with a different key, and then computed the transitive closure of the results. This was performed for the 12 databases as shown in Table 2 and ran all the experiments assigning 4 processors to each independent run. The results are shown in FIG. 12A (Clustering Method) and FIG. 12B (Sorted-Neighborhood Method). As expected, the time increases linearly as the size of the databases increase.

example, a DEC Alpha workstation, a RISC processor-based computer) would produce a total time that is at least half the estimated time.

The present system may be applied to image data obtained by scanning financial documents, and can also be used to create a codebook of background data. In a first such embodiment, the above merge/purge techniques can be used to extract or eliminate redundant records. In this manner, the database is first created by scanning a number of financial documents. Thereafter, a first sort is performed using a key that is specific to background data (or other data, for that matter). Comparisons are made on a predetermined number of sequential records sorted according to the first key to determine whether a match occurs. Identifiers are stored for matched records. A second key is determined by extracting at least a portion of a second field, the records are sorted using the second key, comparison are made on a predetermined number of sequential records sorted in accordance with the second key to determine whether a match occurs. Identifiers are stored again for the matched records. A union of the stored identifiers is made, and the union is subjected to transitive closure. It should be appreciated that one processor can be used and the first and second sorts performed sequentially, or multiple processors can be used in a parallel processing environment as discussed herein.

It should also be appreciated that a codebook database can be created using the merge techniques in conjunction with the scanning techniques discussed. In this embodiment, a database of scanned documents is created and sorted in accordance with a first key that may include, e.g., specific background identifiers. A predetermined window of sequential records are then compared to determine if matches exist. Where matches exist, the background can be subtracted (a purge stage), the background data then sent to a codebook database and an identifier specific to the entry in the codebook database can be stored with the original record sans purged background. In this manner, a codebook database is created.

Therefore, the present invention will improve the operation of systems processing various large databases

TABLE 2

| Original number | Total records | | | Total size (Mbytes) | | |
|---|---|---|---|---|---|---|
| of records | 10 | 30 | 50 | 10 | 30 | 50 |
| 500000 | 584495 | 754354 | 924029 | 45.4 | 58.6 | 71.8 |
| 1000000 | 1169238 | 1508681 | 1847606 | 91.3 | 118.1 | 144.8 |
| 1500000 | 1753892 | 2262808 | 2770641 | 138.1 | 178.4 | 218.7 |
| 1750000 | 2046550 | 2639892 | 3232258 | 161.6 | 208.7 | 255.7 |

Using the graphs in FIGS. 12A and B, the time it will take to process 1 billion records using both methods may be estimated, assuming the time will keep growing linearly as the size of the database increases. For the sorted-neighborhood method, let us consider the last point of the "30" graph. Here, a database with 2,639,892 records was processed in 2172 seconds. Thus, given a database with 1,000,000,000 records, approximately $1\times10^9\times(2172/263892)$ $s=8.2276\times10^5$ $s\approx 10$ days will be needed. Doing the same analysis with the clustering method, a database of size 2,639,892 records was processed in 1621 seconds. Thus, given a database with 1,000,000,000 records, it is expected that approximately $1\times10^9\times(1621/2639892)$ $s=6.1404\times10^5\neq 77$ days will be required. Of course, doubling the speed of the workstations and the channels used (which is possible today since the HP processors are slow compared to, for including, e.g. financial documents that have been scanned and the images stored, due to its ability to efficiently process large numbers of database records and merge corresponding records in the database.

Equivalents

The above description, figures and embodiments are provided not to limit the invention but to assist one skilled in the art in better understanding the invention contained herein. The inventor is not thereby limited to the preferred embodiments. For example, checks may be replaced herein any arbitrary form, document, computer generated image, fingerprint image, voiceprint, and so forth. The disclosure provided in terms of check processing and banking practices may be viewed as a equivalent to any arbitrarily organized document or form processing operation or system in any business, technical or organizational structure.

I claim:

1. A method for processing at least two images and storing the images in a database, comprising the steps of:

(a) scanning the image to create a first digital image thereof;

(b) comparing said first digital image against a codebook of stored digital images;

(c) matching said first digital image with one of said stored digital images;

(d) producing an index code identifying said one of said stored digital images as having matched said first digital image;

(e) subtracting said one of said stored digital images from said first digital image to produce a second digital image;

(f) storing said second digital image together with its respective index code as a record in the database;

(g) repeating steps (a) through (g) at least once for another image;

(h) clustering said stored images with their respective index codes based upon the use of at least one key, wherein said at least, one key comprises a first key and second key;

(i) computing said first key for each record in the database by extracting at least a portion of a first field;

(j) merge sorting the records in the database using said first key;

(k) comparing to each other a predetermined number of sequential reports sorted according to said first key to determine if one or more of the records match;

(l) storing identifiers for any matching records;

(m) computing said second key for each record in the database by extracting at least a portion of a second field;

(n) merge sorting the records in the database using said second key;

(o) comparing to each other a predetermined number of sequential records sorted according to said second key to determine if one or more of the records match;

(p) storing identifiers for any matching records;

(q) creating union of said stored identifiers; and (r) subjecting said union to transitive closure.

2. The method of claim 1, where in the comparing steps are each performed on a separate processor.

3. The method of claim 2, wherein the database is sorted in parallel using parallel merge sorting.

4. The method of claim 3, wherein in each group of processors for each database:

(i) N is a number of records;

(ii) P is a number of processors, each processor p, $1 \leq p \leq P$, being able to store M+w records;
   (a) w is a size of a merge phase window; and
   (b) M is a blocking factor;

(ii) P is less than N;

(iii) $r_i$ represents record i in a cluster, $0 \leq i < MP-1$; and (a) each said comparing step comprises the steps of:

(i) dividing the sorted database into N/MP clusters;

(ii) processing each of the N/MP clusters in turn by providing each processor p with records $r_{(p-1)M}, \ldots, r_{pM-1}, \ldots, r_{pM+w-2}$, for $1 \leq p \leq P$;

(iii) searching matching records independently at each processor using a window of the size w; and (iv) repeating the processing step for a next cluster of records.

5. The method of claim 4, wherein:

(a) in each group of processors for each database:
   (i) N is a number of records in the database;
   (ii) P is a number of processors p, and $1 \leq p \leq P$; and
   (iii) C is a number of clusters to be formed per processor p; and (b) each said comparing step comprises the steps of:
   (i) dividing the N records into CP subranges;
   (ii) assigning to each processor C clusters of the subranges;
   (iii) providing a coordinator processor which reads the database and sends each record to an appropriate processor where each record is received;
   (iv) saving each received record at each processor where it is received in a proper local cluster;
   (v) after the coordinator finishes reading and clustering the data among the processors, sorting and applying a window scanning method to the local clusters of each processor.

6. The method according to claim 5, wherein the coordinator processor load balances the various processors using a simple longest processing time first strategy.

7. A method for processing at least two images, storing the images in a database, and creating a codebook representing portions of at least one of said images, comprising the steps of:

(a) scanning each image to create a first digital image thereof;

(b) storing each scanned image as a record in a database;

(c) computing a first key for each record in the database by extracting at least a portion of a scanned image to create a field image;

(d) merge sorting the records in the database using the first key;

(e) comparing to each other a predetermined number of sequential records sorted according to the first key to determine if another record has a field image that matches the field image;

(f) creating an identifier specific for each such matching field image that identifies the particular record in which the match was found;

(g) subtracting the matched field image from the identified record to produce a residual image;

(h) storing the residual image with its specific identifier;

(i) storing the subtracted, matched field image in a codebook database;

(j) computing a second key for each record in the database by extracting at least a portion of a scanned image to create a second field image;

(k) merge sorting the records in the database using the second key:

(l) comparing to each other a predetermined number of sequential records sorted according to the second key to determine if a record has a field image that matches the second field image;

(m) storing an identifier specific for each such matching second field image that identifies the particular record in which the match was found;

(n) subtracting the matched second field image from the identified record; and (o) storing the matched second field image in a codebook database.

8. The method of claim 7, further comprising the steps of creating a union of the records that matched the first and second field images, and subjecting the union to transitive closure.

9. A method for processing at least two images, storing the image in database, and creating a codebook representing portions of at least one of said images, comprising the steps of:

(a) scanning each image to create a first digital image thereof;

(b) storing each scanned image as a record in a database;

(c) computing a first key for each record in the database by extracting at least a portion of a scanned image to create a field image;

(d) merge sorting the records in the database using the first key;

(e) comparing to each other a predetermined number of sequential records sorted according to the first key to determine if another record has a field image that matches the field image;

(f) creating an identifier specific for each such matching field image that identifies the particular record in which the match was found;

(g) subtracting the matched field image from the identified record to produce a residual image;

(h) storing the residual image with its specific identifier;

(i) storing the subtracted, matched field image in a codebook datebase;

(j) computing a second key for each residual image in the database by extracting at least a portion thereof to create a second field image;

(k) merge sorting the residual images in the database using the second key;

(l) comparing to each other a predetermined number of sequential residual images sorted according to the second key to determine if a residual image has a field image that matches the second field image;

(m) creating an identifier specific for each such matching second field image that identifies the particular residual image in which the match was found;

(n) subtracting the matched second field image from the respective residual image;

(o) storing the residual image with its specific identifier; and (p) storing the subtracted, matched second field image in a codebook database.

10. The method of claim 9, further comprising the steps of creating a union of the records that matched the first and second field images, and subjecting the union to transitive closure.

11. The method of claim 7, wherein the field image is a portion of the background.

12. The method of claim 7, wherein the images are checks.

13. The method of claim 7, wherein said residual image comprises handwritten information, further comprising the steps of determining a plurality of spline control points of at least a portion of said residual image.

14. The method according to claim 7, wherein said residual image comprises handwritten information, further comprising the steps of determining a plurality of Fourier coefficients of at least a portion of said residual image.

15. The method according to claim 7, wherein said residual image comprises handwritten information, further comprising the steps of determining a plurality of wavelets of at least a portion of said residual image.

16. The method according to claim 7, wherein said residual image comprises handwritten information, further comprising the steps of determining a plurality of fractal transforms of at least a portion of said residual image.

17. The method according to claim 7, wherein said residual image comprises handwritten information, further comprising the steps of determining a plurality of spatial patterns of at least a portion of said residual image.

18. The method according to claim 1, wherein each said image comprises a document selected from the group consisting of a check, bank deposit or withdrawal slip, coupon, travelers' cheque, letter of credit, monetary instrument, food stamp, insurance form, medical form, real estate form, an inventory form, real estate document, official government form, brochures, instructional form, questionnaire form, laboratory data form, tax form, computer screen, stock certificate and bond certificate.

* * * * *